United States Patent
Nakanishi

(10) Patent No.: US 12,068,712 B2
(45) Date of Patent: Aug. 20, 2024

(54) DETECTION DEVICE, CONTROL DEVICE, AND CONTROL METHOD

(71) Applicant: DENSO CORPORATION, Kariya (JP)

(72) Inventor: Daisuke Nakanishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 222 days.

(21) Appl. No.: 17/870,933

(22) Filed: Jul. 22, 2022

(65) Prior Publication Data

US 2023/0034672 A1 Feb. 2, 2023

(30) Foreign Application Priority Data

Jul. 27, 2021 (JP) .................. 2021-122566

(51) Int. Cl.
  *G01D 3/036* (2006.01)
  *H02K 7/116* (2006.01)
  *H02K 29/08* (2006.01)
  *H02P 6/16* (2016.01)

(52) U.S. Cl.
  CPC ............... *H02P 6/16* (2013.01); *H02K 7/116* (2013.01); *H02K 29/08* (2013.01)

(58) Field of Classification Search
  CPC ......... H02P 6/16; H02K 7/116; H02K 29/08; G01D 3/0365; G01D 5/145
  See application file for complete search history.

(56) References Cited

U.S. PATENT DOCUMENTS

| | | | |
|---|---|---|---|
| 6,646,435 B1 | 11/2003 | Nakamura et al. | |
| 2008/0074102 A1* | 3/2008 | Kitanaka | G01D 5/145 324/207.2 |
| 2015/0073745 A1* | 3/2015 | Mizuno | G01D 3/0365 702/147 |
| 2021/0152055 A1 | 5/2021 | Mizuo | |
| 2021/0372826 A1 | 12/2021 | Nakanishi | |

FOREIGN PATENT DOCUMENTS

| | | |
|---|---|---|
| JP | 2008-139108 | 6/2008 |
| JP | 2021-143910 | 9/2021 |

* cited by examiner

*Primary Examiner* — Cortez M Cook
(74) *Attorney, Agent, or Firm* — Nixon & Vanderhye P.C.

(57) ABSTRACT

A detection device includes: a sensor that outputs first and second sensor outputs behaving respectively differently according to a change in a rotation angle of an object; a target calculation unit that calculates first and second target angles hat are target values of first and second actual angles corresponding to the first and second sensor outputs; and a selection unit that selects, as a reference destination, one of the first and second sensor outputs for driving the object.

12 Claims, 11 Drawing Sheets

DETECTION DEVICE, CONTROL DEVICE, AND CONTROL METHOD

CROSS REFERENCE TO RELATED APPLICATION

The present application is based on and claims the benefit of priority of Japanese Patent Application No. 2021-122566, filed on Jul. 27, 2021, the disclosure of which is incorporated herein by reference.

TECHNICAL FIELD

The present disclosure generally relates to a detection device, a control device, and a control method.

BACKGROUND INFORMATION

Comparatively, there is known a control device that feedback-controls an actuator so that a rotation angle of an object driven by the actuator approaches a target angle.

SUMMARY

It is an object of the present disclosure to provide a technique that reduces a possibility of rotating an object in an unnecessarily wide angle range in a feedback control for rotating the object.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter, an embodiment of the present disclosure will be described.

Figure 1:
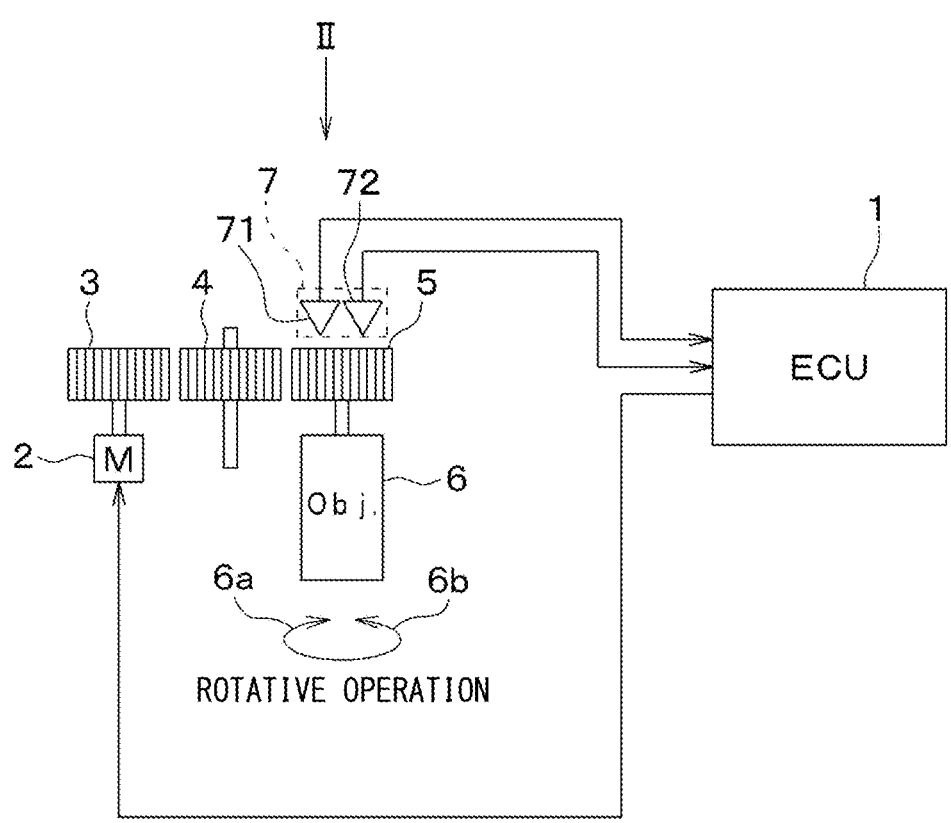
FIG. 1 is a schematic configuration diagram of a mechanical system according to a first embodiment.

As shown in FIG. 1, a rotation system in the present embodiment includes an ECU 1, an actuator 2, a motor gear 3, an intermediate gear 4, an output gear 5, an object 6, and a sensor 7.

The ECU 1 is a device including a processing circuit, a non-volatile storage medium, a volatile storage medium, and the like, and can be realized by, for example, a microcomputer or a microcontroller. The processing circuit performs various processes described later by executing a program recorded in the non-volatile storage medium, and in the performed processes, the volatile storage medium is used as a work area, and a sensor output described later is acquired from the sensor 7, for controlling the actuator 2. The non-volatile storage medium and the volatile storage medium of the ECU 1 are both non-transitory, substantial recording media, e.g., a semiconductor memory.

The actuator 2 is a device that rotationally drives the motor gear 3 according to the control from the ECU 1, and is, for example, an electric motor. The rotation of an output shaft of the actuator 2 causes the motor gear 3 to rotate.

The motor gear 3 includes a central shaft and a gear. The central shaft is connected to the output shaft of the actuator 2, and rotates per a rotational torque of the output shaft. The gear, fixed to the central shaft, rotates integrally with the central shaft about the central shaft. An outer circumference of the gear is an annular shape, and external teeth are formed.

The outer circumference of the intermediate gear 4 is annular, and external teeth are formed. These external teeth mesh with the external teeth of the motor gear 3. With such meshing, the intermediate gear 4 rotates in synchronization with the rotation of the motor gear 3.

The output gear 5 includes a transmission shaft and a gear. An outer circumference of the gear is an annular shape, and external teeth are formed. The external teeth meshes with the external teeth of the intermediate gear 4. With such meshing, the gear of the output gear 5 rotates in synchronization with the rotation of the intermediate gear 4. The transmission shaft is fixed to the gear and rotates integrally with the gear around the transmission shaft. The transmission shaft is connected to the object 6.

The object 6 is connected to the transmission shaft of the output gear 5, and the rotational torque is transmitted from the transmission shaft to rotate the object 6 with the output shaft as the central shaft. The object 6 can rotate in an angle θxceeding 360° in both a positive direction 6a and a negative direction 6b. The object 6 may be, for example, a shift drum used in a vehicle transmission. However, the object 6 is not limited to the shift drum, and may be any object that can rotate in an angle exceeding 360° (i.e., continuously and infinitely) in both the positive and negative directions.

When the actuator 2 operates to generate a rotational torque, the rotational torque is transmitted, from the output shaft of the actuator 2, to the motor gear 3, the intermediate gear 4, and the output gear 5, and further to the object 6 from the transmission shaft of the output gear 5. As a result, the object 6 is rotated by the drive of the actuator 2. When the output shaft of the actuator 2 rotates in the positive direction, the object 6 also rotates in the positive direction 6a, and when the output shaft of the actuator 2 rotates in the negative direction, the object 6 also rotates in the negative direction 6b.

Figure 2:
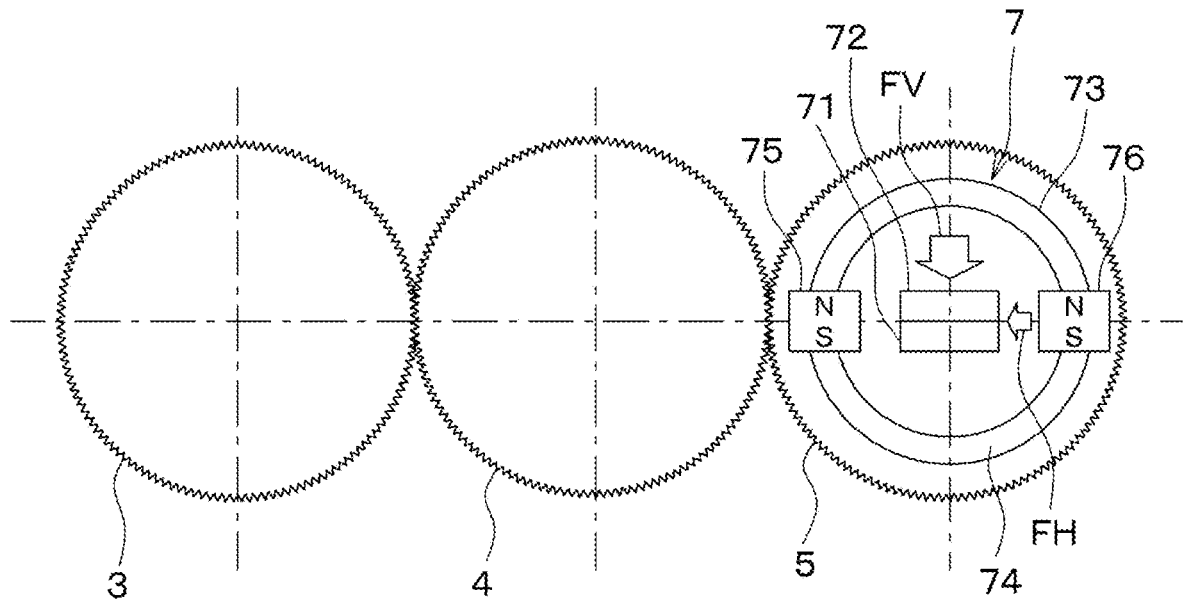
FIG. 2 is a view taken along a line II of FIG. 1.

As shown in FIGS. 1 and 2, the sensor 7 has a first Hall IC 71, a second Hall IC 72, a first yoke 73, a second yoke 74, a first magnet 75, and a second magnet 76. The first yoke 73, the second yoke 74, the first magnet 75, and the second magnet 76 are connected to the output gear 5 and rotate integrally in synchronization with the output gear 5.

Figure 3:
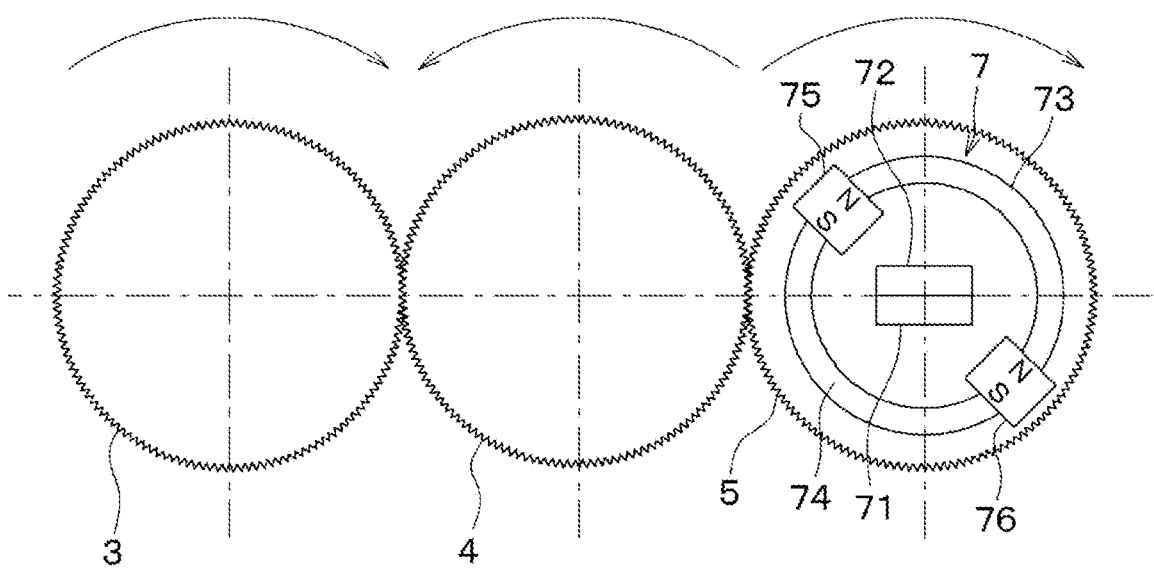
FIG. 3 is another view taken along the line II of FIG. 1.

The first Hall IC 71 and the second Hall IC 72 are arranged at positions surrounded by the first yoke 73, the second yoke 74, the first magnet 75, and the second magnet 76. As shown in FIG. 3, even when the motor gear 3, the intermediate gear 4, and the output gear 5 rotate, and the first yoke 73, the second yoke 74, the first magnet 75, and the second magnet 76 rotate in synchronization with the output gear 5, the first Hall IC 71 and the second Hall IC 72 do not rotate and their postures do not change. Therefore, the rotation of the output gear 5 and the object 6 changes magnetic flux penetrating the first Hall IC 71 and the second Hall IC 72.

The first magnet 75 and the second magnet 76 are arranged at positions facing each other with a rotation center thereof interposed therebetween. The first yoke 73 and the second yoke 74 connect the first magnet 75 and the second magnet 76. The first yoke 73 connects the N pole of the first magnet 75 and the N pole of the second magnet 76. The second yoke 74 connects the S pole of the first magnet 75 and the S pole of the second magnet 76.

The first Hall IC 71 has two Hall elements (not shown), an arithmetic circuit, and a casing for accommodating them. One of the two Hall elements is a horizontal Hall element, which utilizes the Hall effect and outputs, to the arithmetic circuit, a Hall voltage V11 corresponding to the magnetic flux along a direction FV in FIG. 2. The other of the two Hall elements is a vertical Hall element, which utilizes the Hall effect and outputs, to the arithmetic circuit, a Hall voltage V12 corresponding to the magnetic flux along a direction FH in FIG. 2.

The arithmetic circuit of the first Hall IC 71 is a circuit including a CPU (not shown), a non-volatile storage medium, and a volatile storage medium, and the CPU executes a program recorded in the non-volatile storage medium, and, in the execution thereof, uses the volatile storage medium as a work area. Specifically, the arithmetic circuit outputs a voltage corresponding to the rotation angle of the object 6 to the ECU 1 outside the first Hall IC 71 based on the Hall voltages V11 and V12 from the two Hall elements. Hereinafter, the output from the arithmetic circuit is referred to as a first sensor output X1. The voltage of the first sensor output X1 is adjusted to, for example, 0.5V to 4.5V.

The second Hall IC 72 may be arranged to face the first Hall IC 71 in the direction FV, for example. The second Hall IC 72 has two Hall elements (not shown), an arithmetic circuit, and a casing for accommodating them. One of the two Hall elements is a horizontal Hall element, which utilizes the Hall effect and outputs, to the arithmetic circuit, a Hall voltage V21 corresponding to the magnetic flux along the direction FV in FIG. 2. The other of the two Hall elements is a vertical Hall element, which utilizes the Hall effect and outputs, to the arithmetic circuit, a Hall voltage V22 corresponding to the magnetic flux along the direction FH in FIG. 2.

The arithmetic circuit of the second Hall IC 72 is a circuit including a CPU (not shown), a non-volatile storage medium, and a volatile storage medium, and the CPU executes a program recorded in the non-volatile storage medium, and in the execution thereof, uses a volatile storage medium as the work area. Specifically, the arithmetic circuit outputs a voltage corresponding to the rotation angle of the object 6 to the ECU 1 outside the second Hall IC 72 based on the Hall voltages V21 and V22 from the two Hall elements. Hereinafter, the output from the arithmetic circuit is referred to as a second sensor output X2. The voltage of the second sensor output X2 is adjusted to, for example, 0.5V to 4.5V.

The non-volatile storage medium and the volatile storage medium included in the arithmetic circuits in the first Hall IC 71 and the second Hall IC 72 are both non-transitory, substantial recording media, e.g., a semiconductor memory.

Hereinafter, the operation of the rotation system having the above configuration will be described. First, the operation of the arithmetic circuit of the first Hall IC 71 will be described. The arithmetic circuit of the first Hall IC 71 repeats the process shown in FIG. 4 based on the Hall voltages V11 and V12 output from the two Hall elements of the first Hall IC 71 according to the program in the non-volatile storage medium of the own circuit.

Figure 4:
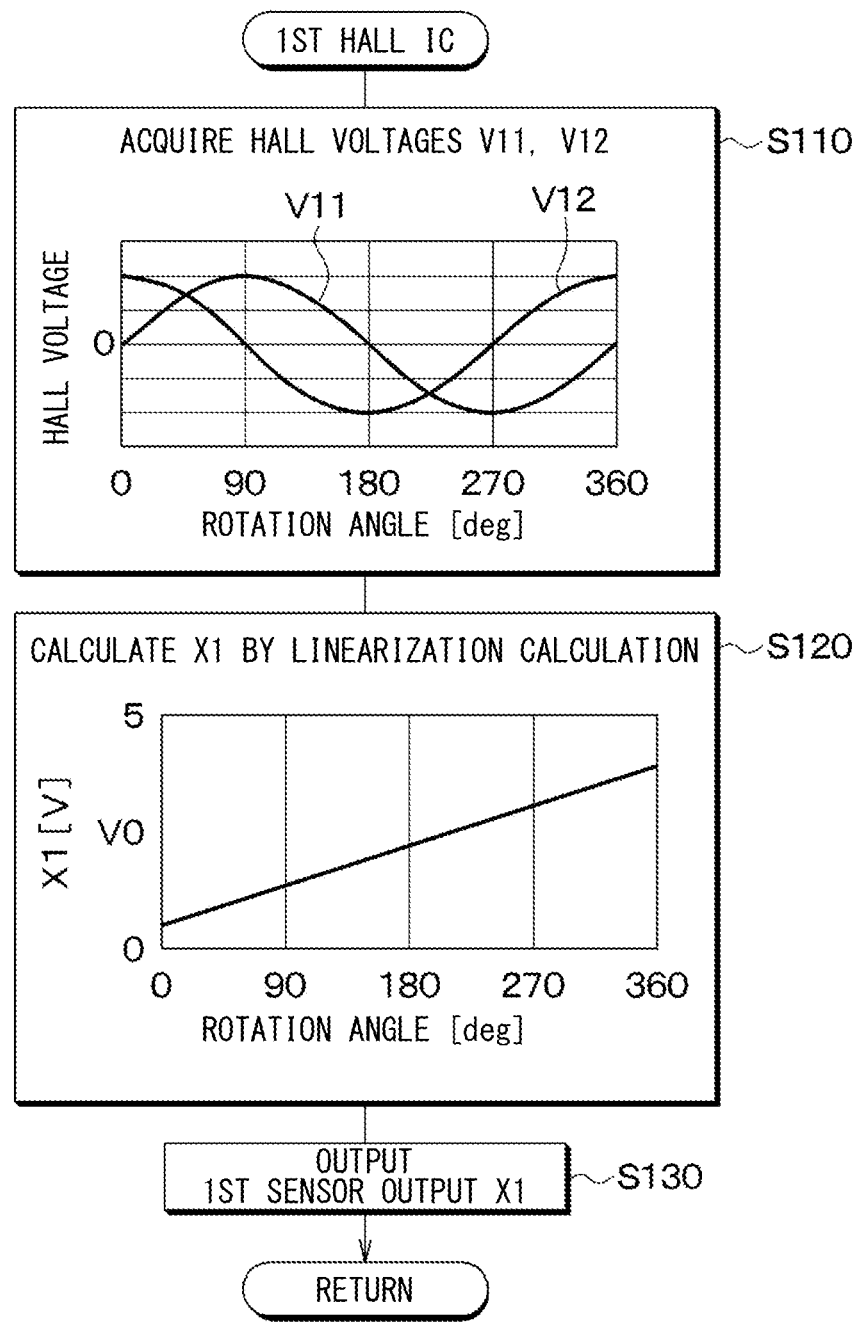
FIG. 4 is a diagram showing processing contents of a calculation unit of a first Hall IC.

In the process of FIG. 4, the arithmetic circuit first acquires the Hall voltages V11 and V12 from the two Hall elements of the first Hall IC 71 in step S110. As shown in FIG. 4, the Hall voltages V11 and V12 change in a 360° cycle in proportion to the magnetic flux that changes according to the rotation angle of the object 6. The phases of the Hall voltages V11 and V12 are 90° out of phase with (i.e., shifted from) each other. This is because the directions FV and FH of the magnetic flux that affect the outputs of the two Hall elements are deviated by 90°. That is, the magnetic sensing surfaces of the two Hall elements are offset by 90°. For example, the Hall voltage V11 has a sine curve with a cycle of 360°, and the Hall voltage V12 has a cosine curve with a cycle of 360°.

Subsequently, in step S120, the arithmetic circuit calculates the first sensor output X1 by a linearization calculation using the Hall voltages V11 and V12. The first sensor output X1 calculated at such timing is a voltage value having a periodicity of 360° cycle. Then, the first sensor output X1 gradually increases from a lower limit value to an upper limit value in a predetermined first normal range as the rotation angle of the object 6 increases within one cycle of itself.

Then, as the rotation angle of the object 6 increases, which makes the rotation angle of the object 6 passing through a first transition range deviating from the first normal range, the first sensor output X1 changes in a direction of increase or decrease different from the one in the first normal range (i.e., in a decreasing direction), from the upper limit value to the lower limit value, in a manner of change more steeply than in the first normal range.

Here, an angle width of the first normal range is sufficiently greater than an angle width of the first transition range. In the present embodiment, the first normal range is a range of approximately 360°, ranging from 0° to 360°, and the first transition range is a range in which the width centered on 0°, 360°, etc. is approximately 0°. However, the angle width of the first normal range may be narrower than the above, and the angle width of the first transition range may be wider than the above. Further, in the present embodiment, the first sensor output X1 increases linearly and monotonically with respect to the rotation angle in the first normal range, but may increase non-linearly and monotonically, or may increase stepwise. Further, the first normal range covers the entirety of a second transition range described later. Further, in the present embodiment, the first sensor output X1 changes discontinuously in the first transition range, but it may change continuously.

Specifically, the first sensor output X1 is calculated by an arithmetic expression $X1 = K \times \mathrm{atan}\,2(V11/V12) + V0$. Here, $\mathrm{atan}\,2(V11/V12)$ is an inverse tangent function whose range is extended from $-180°$ to $180°$. Specifically, it is obtained by an expression atan 2 (V11/V12)=arctan (V11/V12)−180°×sgn (V11)×{1−U (V12)}. Note, calculation may be performed by using a look-up table.

Here, arctan ( ) is an ordinary inverse tangent function whose range ranges from −90° to 90°.

Further, sgn ( ) is a sign function that becomes 1 if the argument is positive, −1 if the argument is negative, and 0 if the argument is zero.

Further, U ( ) is a unit step function that becomes 1 if the argument is 0 or more and 0 if the argument is negative.

Further, V0 is a positive voltage value predetermined to be a reference value such as a median value or the like.

Further, K is a predetermined positive coefficient.

Subsequently, in step S130, the arithmetic circuit outputs a voltage corresponding to the calculated first sensor output X1 to the ECU 1. The arithmetic circuit of the first Hall IC 71 sequentially outputs a voltage corresponding to the first sensor output X1 to the ECU 1 by repeating the processes of steps S110 to S130.

Next, the operation of the arithmetic circuit of the second Hall IC 72 will be described.

Figure 5:
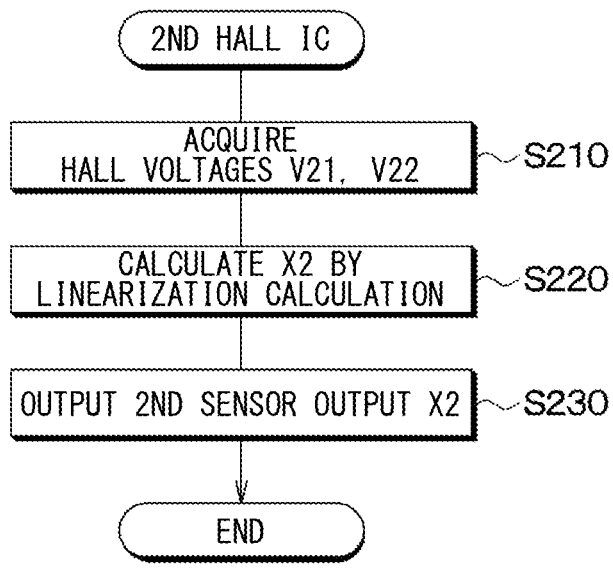
FIG. 5 is a diagram showing processing contents of a calculation unit of a second Hall IC.

The arithmetic circuit of the second Hall IC 72 repeats the process shown in FIG. 5 based on the Hall voltages V21 and V22 output from the two Hall elements of the second Hall IC 72 according to the program stored in the non-volatile storage medium of the own circuit.

In the process of FIG. 5, the arithmetic circuit first acquires the Hall voltages V21 and V22 from the two Hall elements of the second Hall IC 72 in step S210. The Hall voltages V21 and V22 change in a 360° cycle in proportion to the magnetic flux that changes according to the rotation angle of the object 6. The phases of the Hall voltages V21 and V22 are 90° out of phase with each other. This is because the directions FV and FH of the magnetic flux that affect the outputs of the two Hall elements are deviated by 90°. That is, the magnetic sensing surfaces of the two Hall elements are offset by 90°. For example, the Hall voltage V21 has a sine curve with a cycle of 360°, and the Hall voltage V22 has a cosine curve with a cycle of 360°.

More specifically, in the present embodiment, the Hall voltage V21 is the same as the Hall voltage V11, and the Hall voltage V22 is the same as the Hall voltage V12, but as another example, the Hall voltage V21 may be different from the Hall voltage V11, and the Hall voltage V22 may be different from the Hall voltage V12.

Subsequently, in step S220, the arithmetic circuit calculates the second sensor output X2 by a linearization calculation using the Hall voltages V21 and V22. The second sensor output X2 calculated at such timing is a voltage value having a periodicity of 360° cycle. Then, the second sensor output X2 gradually increases from the lower limit value to the upper limit value in a predetermined second normal range as the rotation angle of the object 6 increases within one cycle of itself.

Then, as the rotation angle of the object 6 increases, which makes the rotation angle of the object 6 passing through a second transition range deviating from the second normal range, the second sensor output X2 changes in a direction of increase or decrease different from the one in the second normal range (i.e., in a decreasing direction), from the upper limit value to the lower limit value, in a manner of change more steeply than in the second normal range.

Note that the second normal range and the second transition range are ranges for the rotation angle of the object 6.

Figure 6:
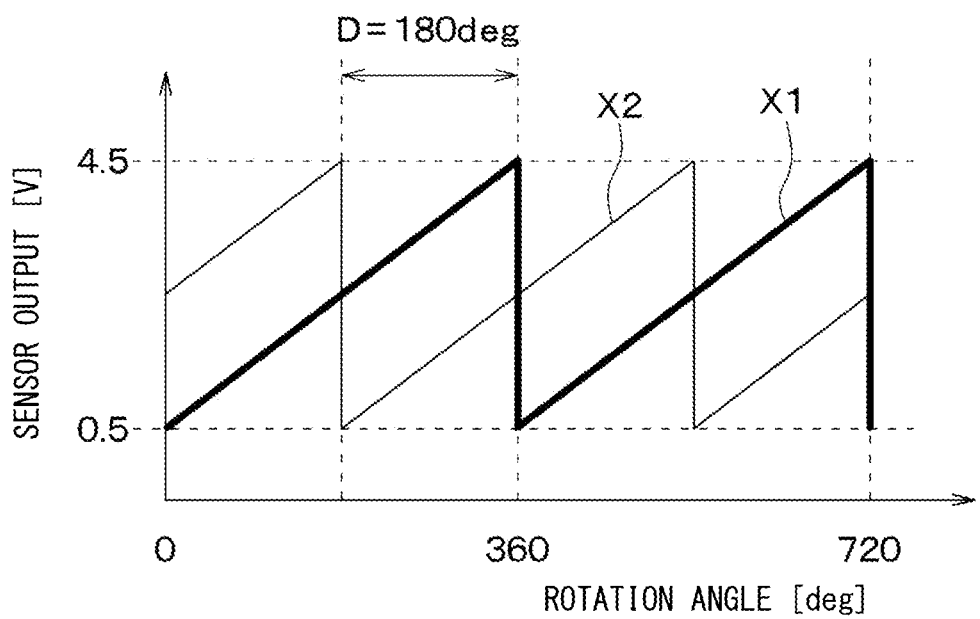
FIG. 6 is a diagram showing behavior of a first sensor output and a second sensor output according to a rotation angle.

Here, the angle width of the second normal range is sufficiently greater than the angle width of the second transition range. In the present embodiment, as shown in FIG. 6, the second normal range is a range of approximately 360° from 180° to 540°, and the second transition range is a range in which the width centered on 180°, 540°, and the like is approximately 0°. However, the angle width of the second normal range may be narrower than the above, and the angle width of the second transition range may be wider than the above. Further, in the present embodiment, the second sensor output X2 increases linearly and monotonically with respect to the rotation angle in the second normal range, but may increase non-linearly and monotonically, or may increase stepwise. Further, the second normal range covers the entirety of the first transition range. Further, in the present embodiment, the second sensor output X2 changes discontinuously in the second transition range, but it may change continuously.

Specifically, the second sensor output X2 is calculated by an arithmetic expression X2=K×{atan 3 (V21/V22)+180}+V0.

Here, atan 3 (V21/V22) is an inverse tangent function whose range ranges from −180° to 180°.

Specifically, it is obtained by an expression atan 3 (V21/V22)=arctan (V21/V22)+180°×sgn(V21)×{1−U(−1×V22)}.

Here, arctan ( ), sgn ( ), U( ), V0, K are as described above.

As shown in FIG. 6, the second sensor output X2 calculated in such manner is 180° out of phase with respect to the first sensor output X1. That is, a phase difference D between the first sensor output X1 and the second sensor output X2 is 180°. Therefore, an angle difference between the center of the first transition range and the center of the second transition range is 180°. Further, the first transition range and the second transition range do not overlap and are separated from each other. As described above, the first sensor output X1 and the second sensor output X2 change differently, i.e., in different behaviors, according to the change in the rotation angle of the object 6.

It should be noted that the above method is only one of several methods for assuming that the second sensor output X2 is 180° out of phase with respect to the first sensor output X1, and other methods may be adoptable.

Specifically, in the above method, the hall voltages V21 and V22 are made the same as the hall voltages V11 and V12, respectively, and the calculation expression of the second sensor output X2 is different from the calculation expression of the first sensor output X1.

As the other method that can be adopted, for example, there is a method in which the calculation expression of the second sensor output X2 is the same as the calculation expression of the first sensor output X1. In such a method, the arrangement of the two Hall elements of the second Hall IC 72 is adjusted so that the Hall voltages V21 and V22 are 180° out of phase with respect to the Hall voltages V11 and V12, respectively.

Subsequently, in step S230, the arithmetic circuit outputs a voltage corresponding to the calculated second sensor output X2 to the ECU 1. By repeating the processing of steps S210 to S230, the arithmetic circuit of the second Hall IC 72 sequentially and repeatedly outputs the voltage corresponding to the second sensor output X2 to the ECU 1.

Next, the operation of the ECU 1 will be described.

Figure 7:
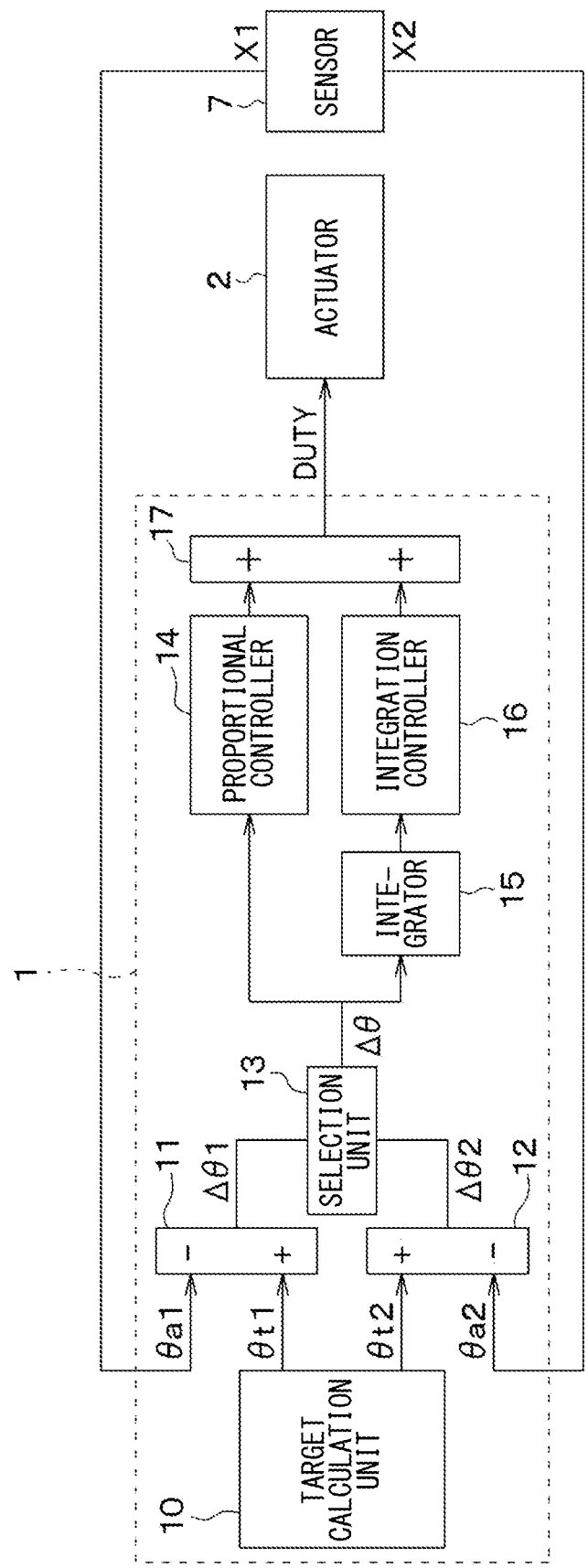
FIG. 7 is a block diagram showing processing contents of an ECU.

The ECU 1 executes a program recorded in its own non-volatile storage medium, and functions as a target calculation unit 10, a first deviation calculation unit 11, a second deviation calculation unit 12, a selection unit 13, a proportional controller 14, an integrator 15, an integration controller 16, and a feedback control unit 17 shown in FIG. 7.

Alternatively, the ECU 1 may have dedicated hardware corresponding to each of the target calculation unit 10, the first deviation calculation unit 11, the second deviation calculation unit 12, the selection unit 13, the proportional controller 14, the integrator 15, the integration controller 16, and the feedback control unit 17.

The target calculation unit 10 calculates a first target angle $\theta t1$ and outputs it to the first deviation calculation unit 11, and also calculates a second target angle $\theta t2$ and outputs it to the second deviation calculation unit 12. Both of the first target angle $\theta t1$ and the second target angle $\theta t2$ are target values for the rotation angle of the object 6, and are set as values of 0° or more and less than 360°. The first target angle $\theta t1$ is a target value to be realized by the first actual angle $\theta a1$ of the object 6, and the second target angle $\theta t2$ is a target value to be realized by the second actual angle $\theta a2$ of the object 6. Both of the first actual angle $\theta a1$ and the second actual angle $\theta a2$ are set as values of 0° or more and less than 360°.

The first actual angle $\theta a1$ is a detection angle of the object 6 calculated by the first deviation calculation unit 11 based on the first sensor output X1. The first actual angle $\theta a1$ becomes 0° when the first sensor output X1 takes a minimum value, and becomes 360° when the first sensor output X1 takes a maximum value, and changes linearly with respect to the first sensor output X1. The second actual angle $\theta a2$ is a detection angle of the object 6 calculated by the second deviation calculation unit 12 based on the second sensor output X2. The second actual angle $\theta a2$ becomes 0° when the second sensor output X2 takes a minimum value, 360° when the second sensor output X2 takes a maximum value, and changes linearly with respect to the second sensor output X2.

The first target angle $\theta t1$ may be calculated by any method. For example, it may be determined according to a certain purpose of the operation of the object 6. The second target angle $\theta t2$ is calculated based on the first target angle $\theta t1$. For example, in the present embodiment, since the phase of the second sensor output X2 is shifted by D=180° with respect to the first sensor output X1, the second target angle $\theta t2$ is obtained as a value by adding 180° to the first target angle $\theta t1$. However, if the second target angle $\theta t2$ calculated by such addition is 360° or more, the second target angle $\theta t2$ is calculated by further subtracting 360° from such a value, i.e., from the second target angle $\theta t2$ exceeding 360°. The first deviation calculation unit 11 calculates a first angle deviation $\Delta\theta 1$ based on the first target angle $\theta t1$ output from the target calculation unit 10 and the first sensor output X1 output from the first Hall IC 71. Specifically, the first actual angle $\theta a1$ is calculated from the first sensor output X1 as described above, and the first actual angle $\theta a1$ is subtracted from the first target angle $\theta t1$, and the subtraction result is set as the first angle deviation $\Delta\theta 1$. Then, the first deviation calculation unit 11 outputs the first angle deviation $\Delta\theta 1$ to the selection unit 13.

The second deviation calculation unit 12 calculates a second angle deviation $\Delta\theta 2$ based on the second target angle $\theta t2$ output from the target calculation unit 10 and the second sensor output X2 output from the second Hall IC 72. Specifically, the second actual angle $\theta a2$ is calculated from the second sensor output X2 as described above, and the second actual angle $\theta a2$ is subtracted from the second target angle $\theta t2$, and the subtraction result is set the second angle deviation $\Delta\theta 2$. Then, the second deviation calculation unit 12 outputs the second angle deviation $\Delta\theta 2$ to the selection unit 13.

The selection unit 13 selects one of the first angle deviation $\Delta\theta 1$ output from the first deviation calculation unit 11 and the second angle deviation $\Delta\theta 2$ output from the second deviation calculation unit 12, and the selected one is output to the proportional controller 14 and the integrator 15 as the angle deviation $\Delta\theta$. That is, the selection unit 13 switchably selects one of the first sensor output X1 and the second sensor output X2 as a reference destination used for driving the object 6. The processing contents of the selection unit 13 will be described in detail later.

The proportional controller 14 calculates a P term proportional to the angle deviation $\Delta\theta$ output from the selection unit 13, and outputs the calculated P term to the feedback control unit 17. The integrator 15 performs an integral operation according to the angle deviation $\Delta\theta$ for a plurality of times output from the selection unit 13, and outputs the result of the integral operation to the integration controller 16. The integration controller 16 calculates an I term proportional to the result of the integral operation output by the integrator 15, and outputs the calculated I term to the feedback control unit 17.

The feedback control unit 17 outputs a control signal for controlling the actuator 2 so that the rotation angle of the object 6 approaches the target angle based on the P term output from the proportional controller 14 and the I term output from the integration controller 16. Therefore, the proportional controller 14, the integrator 15, the integration controller 16, and the feedback control unit 17 perform feedback control by PI control as a whole.

Here, the processing of the selection unit 13 will be described in detail with reference to FIGS. 8, 9A to 9F, and 10A to 10F.

Figure 8:
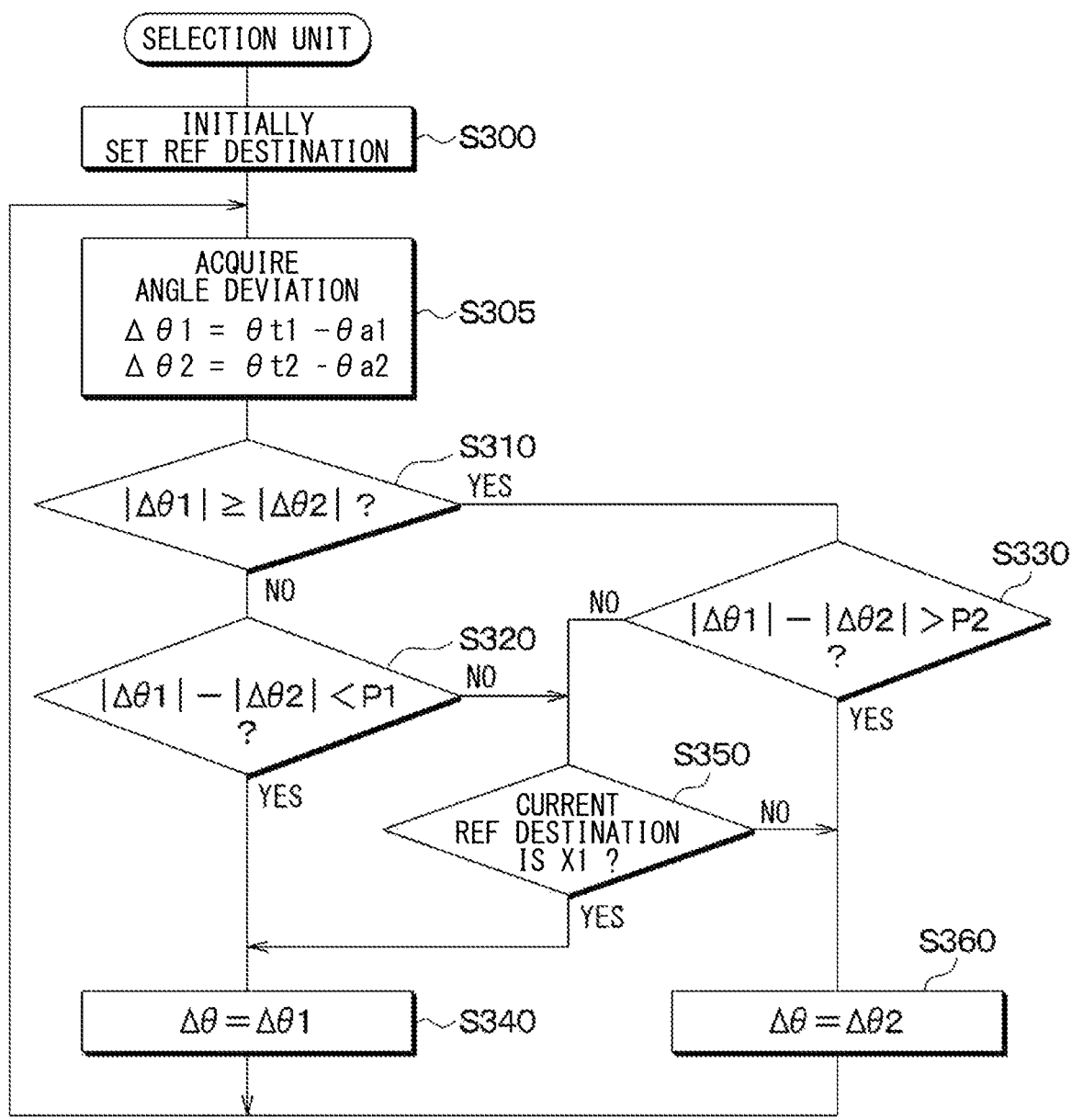
FIG. 8 is a flowchart showing processing contents of a selection unit.
Figure 9A:
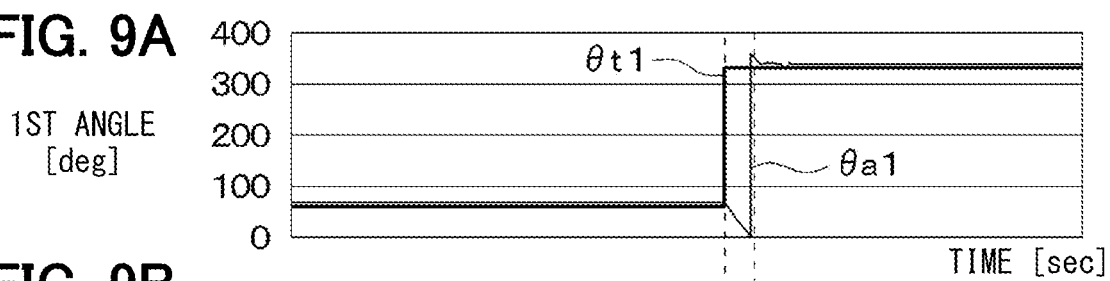
FIGS. 9A to 9F is, respectively, a diagram showing examples of behavior of various amounts over time.
Figure 9B:
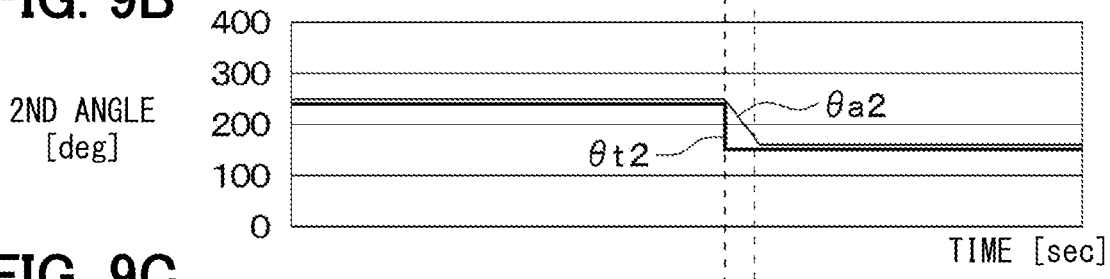
Figure 9C:
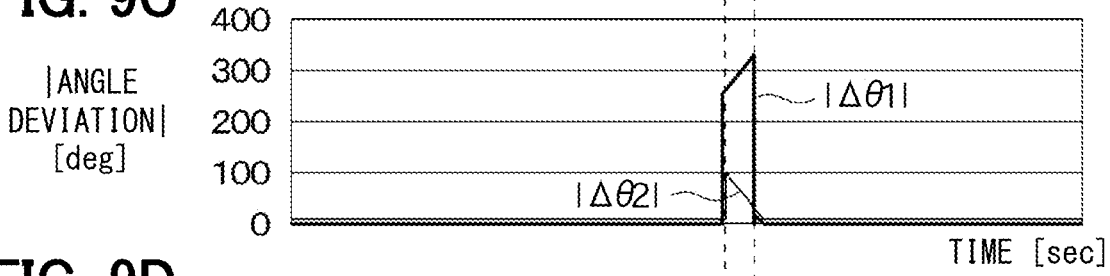
Figure 9D:
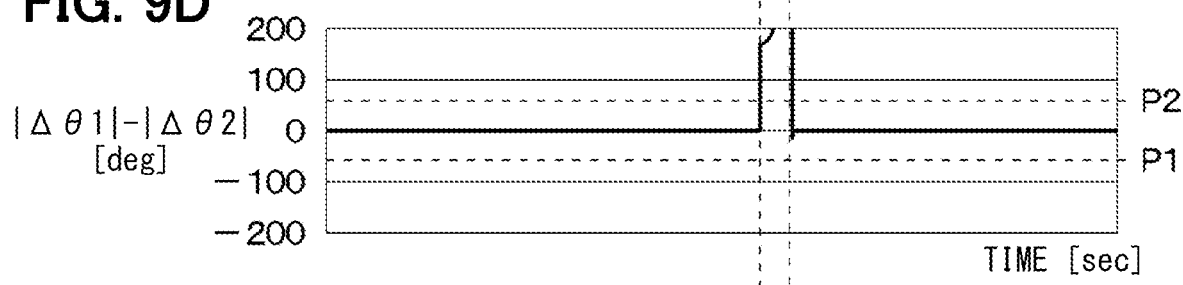
Figure 9E:
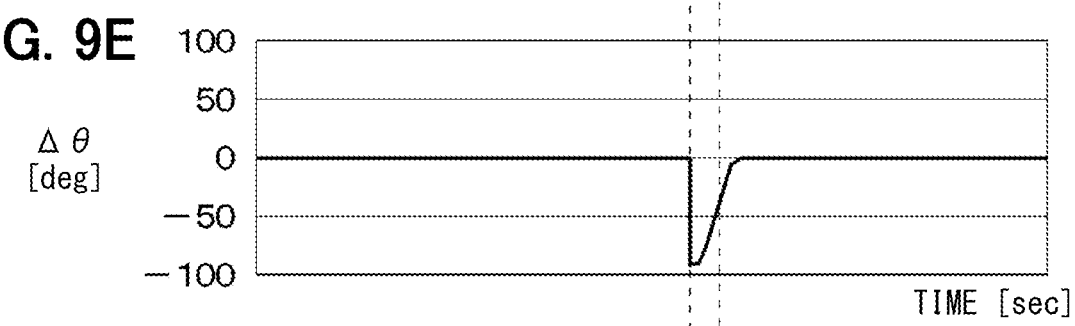
Figure 9F:
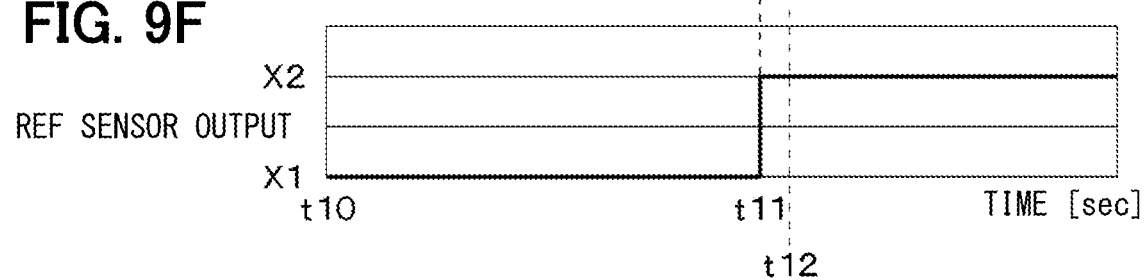
Figure 10A:
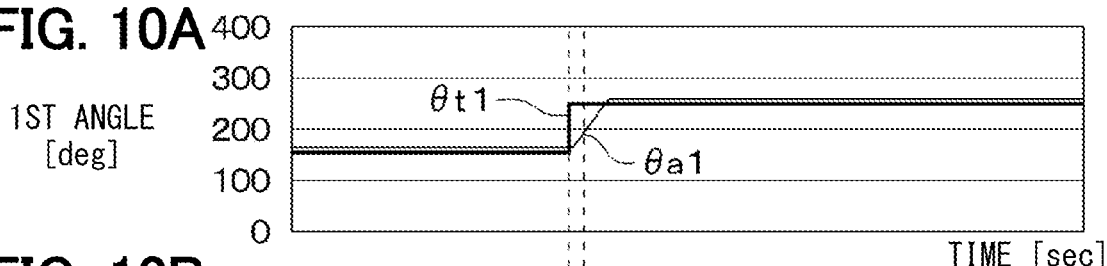
FIGS. 10A to 10F is, respectively, a diagram showing examples of behavior of various amounts over time.
Figure 10B:
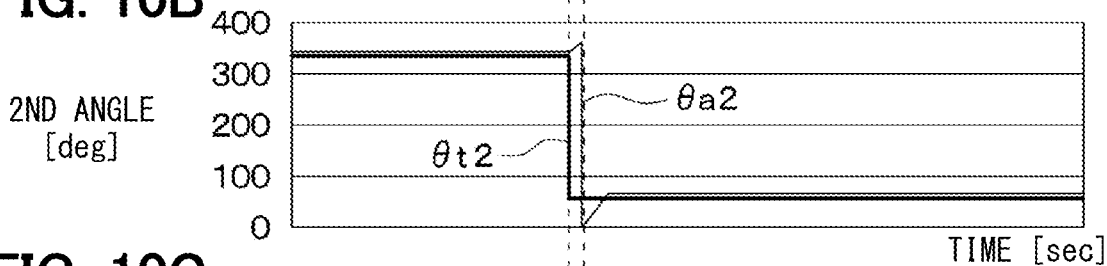
Figure 10C:
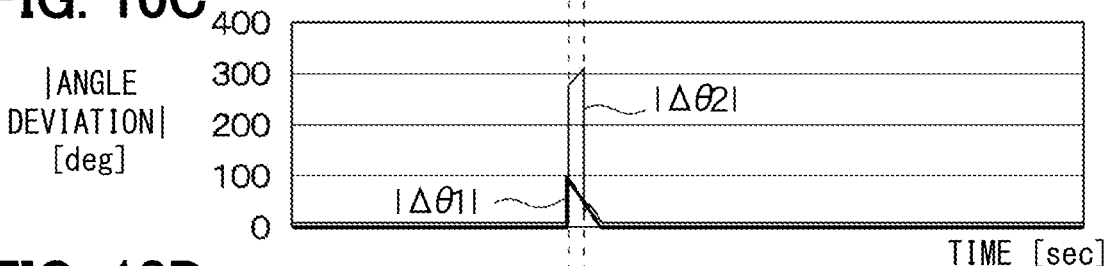
Figure 10D:
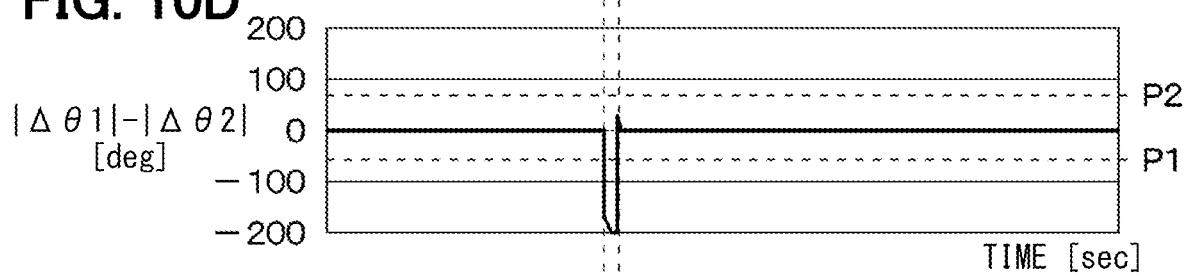
Figure 10E:
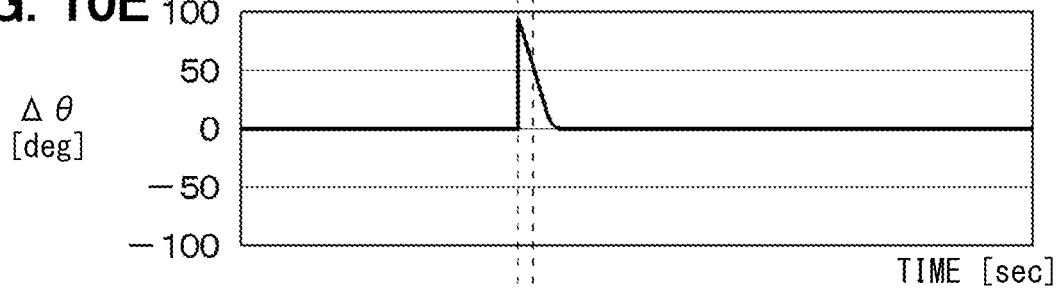
Figure 10F:
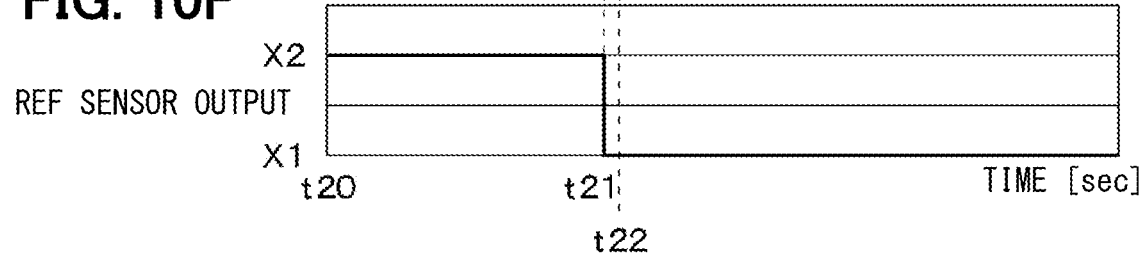

The selection unit 13 performs the process shown in FIG. 8. Specifically, after the start of operation, the selection unit 13 initially sets a reference destination in step S300. That is, one of the first sensor output X1 and the second sensor output X2 is used as a reference destination. Specifically, the first sensor output X1 may be used as a reference destination, or the second sensor output X2 may be used as a reference destination. A reference destination is also known as a selected sensor.

Subsequently, in step S305, the first angle deviation $\Delta\theta 1$ and the second angle deviation $\Delta\theta 2$ are acquired from the first deviation calculation unit 11 and the second deviation calculation unit 12, respectively. Subsequently, in step S310, an absolute value of the first angle deviation $\Delta\theta 1$ is compared with an absolute value of the second angle deviation $\Delta\theta 2$, and it is determined whether or not the former is equal to or greater than the latter. If the former is less than the latter, the process proceeds to step S320, and if the former is equal to or greater than the latter, the process proceeds to step S330.

In step S320, it is determined whether or not a value obtained by subtracting the absolute value of the second angle deviation $\Delta\theta 2$ from the absolute value of the first angle deviation $\Delta\theta 1$ is smaller than a negative threshold value P1, regarding which a positive determination makes the process proceed to step S340, and a negative determination makes the process proceed to step S350.

In step S330, it is determined whether or not a value obtained by subtracting the absolute value of the second angle deviation $\Delta\theta 2$ from the absolute value of the first angle deviation $\Delta\theta 1$ is greater than a positive threshold value P2, regarding which a positive determination makes the process proceed to step S360, and a negative determination makes the process proceed to step S350.

In step S350, it is determined whether or not a current (i.e., currently-selected) reference destination is the first sensor output X1. Then, if it is the first sensor output X1, the process proceeds to step S340 in order to maintain the current (i.e., currently-selected) reference destination, and if it is not the first sensor output X1 (that is, if it is the second sensor output X2), the process proceeds to step S360 to select a current reference destination.

In step S340, the current reference destination is set to the first sensor output X1. That is, the value of the first angle deviation $\Delta\theta 1$ is output to the proportional controller 14 and the integrator 15 as the angle deviation $\Delta\theta$. Then, after step S340, the process returns to step S305.

In step S360, the current reference destination is set to the second sensor output X2. That is, the value of the second angle deviation $\Delta\theta 2$ is output to the proportional controller 14 and the integrator 15 as the angle deviation $\Delta\theta$. Then, after step S360, the process returns to step S305.

Hereinafter, examples of behavior of various amounts over time according to the selection by the selection unit 13 are shown in FIGS. 9A to 9F and 10A to 10F.

In the example of FIG. 9 (FIGS. 9A to 9F collectively), the reference destination is the first sensor output X1 at time t10, and the reference destination is switched from the first sensor output X1 to the second sensor output X2 subsequently at time t11. In the example of FIG. 10 (FIGS. 10A to 10F collectively), the reference destination is the second sensor output X2 at time t11, and the reference destination is switched from the second sensor output X2 to the first sensor output X1 subsequently at time t21.

[FIG. 9: From Time t10 to Just Before Time t11]

First, an example of FIG. 9 will be described. In this example, the first target angle $\theta t1$ is constant from time t10 to just before time t11, and the first actual angle $\theta a1$ is substantially the same as the first target angle $\theta t1$ and is substantially constant. Therefore, similarly, the second target angle $\theta t2$ is constant from time t10 to just before time t11, and the second actual angle $\theta a2$ is substantially the same as the second target angle $\theta t2$ and is substantially constant. Note that, as described above, the second target angle $\theta t2$ deviates by 180° from the first target angle $\theta t1$.

Therefore, from time t10 to just before time t11, the first angle deviation $\Delta\theta 1$ and the second angle deviation $\Delta\theta 2$ are substantially zero, and the value obtained by subtracting the absolute value of the second angle deviation $\Delta\theta 2$ from the absolute value of the first angle deviation $\Delta\theta 1$ is also substantially zero.

During a period from time t10 to just before time t11, the selection unit 13 acquires the first angle deviation $\Delta\theta 1$ and the second angle deviation $\Delta\theta 2$ both of which are almost zero in step S305, and the absolute value of the first angle deviation $\Delta\theta 1$ and the absolute value of the second angle deviation $\Delta\theta 2$ are compared subsequently in step S310.

During the above period, these two absolute values are both substantially zero, and their magnitude relationship varies depending on nominal detection errors in the first Hall IC 71 and the second Hall IC 72. Further, since the absolute value of the first angle deviation $\Delta\theta 1$ and the absolute value of the second angle deviation $\Delta\theta 2$ are almost the same, the difference between the absolute value of the first angle deviation $\Delta\theta 1$ and the absolute value of the second angle deviation $\Delta\theta 2$ is greater than the threshold value P1, and is smaller than the threshold P2.

Therefore, during the above period, if the absolute value of the second angle deviation $\Delta\theta 2$ is greater than the absolute value of the first angle deviation $\Delta\theta 1$, the selection unit 13 proceeds the process from step S310 to step S320, and further from step S320 to step S350. If (i) the absolute value of the second angle deviation $\Delta\theta 2$ is smaller than the absolute value of the first angle deviation $\Delta\theta 1$ and (ii) the absolute value of the second angle deviation $\Delta\theta 2$ is the same as the absolute value of the first angle deviation $\Delta\theta 1$, the process proceeds from step S310 to step S330, and further from step S330 to step S350.

Note that the threshold values P1 and P2 are set in advance in order to filter a nominal difference between the first angle deviation $\Delta\theta 1$ and the second angle deviation $\Delta\theta 2$. For example, the absolute values of the threshold values P1 and P2 may be smaller than ½ of the absolute value of the phase difference between the first sensor output X1 and the second sensor output X2, or may be smaller than ⅕ of such absolute value.

When the selection unit 13 proceeds to step S350 in such manner, since the current reference destination is the first sensor output X1, the selection unit 13 further proceeds to step S340 and selects the first angle deviation $\Delta\theta 1$ as the angle deviation $\Delta\theta$ to be output therefrom. That is, the current reference destination is maintained as the first sensor output X1. Such an operation is repeated from time t10 to just before time t11.

Since the angle deviation $\Delta\theta$ output from the selection unit 13 during the above period is substantially zero, the actuator 2 keeps the rotation angle of the object 6 as the same angle (i.e., the angle stays unchanged) by the feedback control performed by the proportional controller 14, the integrator 15, the integration controller 16 and the feedback control unit 17.

[FIG. 9: Time t11]

At time t11 in the example of FIG. 9, the target calculation unit 10 changes the first target angle $\theta t1$ from 70° to 330° and outputs the same. Note that the value of the change (i.e., to 330°) is only an example, and is not limited to the above. Along with the above, the second target angle $\theta t2$ is changed from 250° to 330°+180°−360°=150° and is output. The first actual angle $\theta a1$ and the second actual angle $\theta a2$ are the same as before time t11.

Therefore, the first angle deviation $\Delta\theta 1$ calculated and output by the first deviation calculation unit 11 is 260°. Further, the second angle deviation $\Delta\theta 2$ calculated and output by the second deviation calculation unit 12 is −100°. Therefore, the difference between the absolute value of the first angle deviation $\Delta\theta 1$ and the absolute value of the second angle deviation $\Delta\theta 2$ is 160°, which is greater than the threshold value P2.

Therefore, at time t11, the selection unit 13 proceeds from step S310 to step S330 because the absolute value of the second angle deviation $\Delta\theta 2$ is smaller than the absolute value of the first angle deviation $\Delta\theta 1$. Further, since the difference between the absolute value of the first angle deviation $\Delta\theta 1$ and the absolute value of the second angle deviation $\Delta\theta 2$ is greater than the threshold value P2, the process proceeds from step S330 to step S360. Then, in step S360, the reference destination is switched from the current one, i.e., the first sensor output X1, to the second sensor output X2. That is, the value output as the angle deviation $\Delta\theta$ is switched from the first angle deviation $\Delta\theta 1$ to the second angle deviation $\Delta\theta 2$.

As a result, feedback control is performed by the proportional controller 14, the integrator 15, the integration controller 16, and the feedback control unit 17 according to the angle deviation $\Delta\theta$ output from the selection unit 13. Then, the feedback control unit 17 controls the actuator 2 so that the rotation angle of the object 6 approaches the second target angle $\theta t2$ from the second actual angle $\theta a2$. This is because the angle deviation Δθ is the second angle deviation Δθ2 corresponding to the difference between the second target angle θt2 and the second actual angle θa2. As a result, the object 6 is driven to rotate in the direction in which the second actual angle θa2 decreases (that is, in the negative direction 6b).

Assuming, at time t11, the angle deviation Δθ is the first angle deviation Δθ1 and the feedback control unit 17 controls the actuator 2 so that the rotation angle of the object 6 approaches from the first actual angle θa1 toward the first target angle θt1. Then, finally, the rotation angle of the object 6 must be changed by as much an amount as 260° in the positive direction 6a for avoiding the first transition range. On the other hand, in the example described above, by avoiding the second transition range, the rotation angle of the object 6 is changed only by 100° in the negative direction 6b via the first transition range. That is, by adopting the rotation scheme in the example described above, it is possible to prevent the object 6 from unnecessarily rotating in a wide angle range.

[FIG. 9: From Just after Time t11 to Just Before Time t12]

In the example of FIG. 9, the value of the first target angle θt1 and the value of the second target angle θt2 are the same as those of time t11 in the period from after time t11 to just before time t12. Then, the first actual angle θa1 and the second actual angle θa2 change sequentially. Specifically, both of the first actual angle θa1 and the second actual angle θa2 are reduced by the feedback control described later.

Then, during this period, the first angle deviation Δθ1 increases from 260° and moves away from zero. Further, the second angle deviation Δθ2 increases from −100° and approaches zero. Therefore, since the difference between the absolute value of the first angle deviation Δθ1 and the absolute value of the second angle deviation Δθ2 also increases, it is still greater than the threshold value P2.

Therefore, in this period, the selection unit 13 proceeds from step S310 to step S330 because the absolute value of the second angle deviation Δθ2 is smaller than the absolute value of the first angle deviation Δθ1. Further, since the difference between the absolute value of the first angle deviation Δθ1 and the absolute value of the second angle deviation Δθ2 is greater than the threshold value P2, the process proceeds from step S330 to step S360. Then, in step S360, the reference destination is maintained as the current one, i.e., as the second sensor output X2. That is, the value output as the angle deviation Δθ is maintained at the second angle deviation Δθ2.

As a result, feedback control is performed by the proportional controller 14, the integrator 15, the integration controller 16, and the feedback control unit 17 according to the angle deviation Δθ output from the selection unit 13. Then, the feedback control unit 17 controls the actuator 2 so that the rotation angle of the object 6 approaches the second target angle θt2 from the second actual angle θa2. This is because the angle deviation Δθ is the second angle deviation Δθ2 corresponding to the difference between the second target angle θt2 and the second actual angle θa2. As a result, the object 6 is driven to rotate in the direction in which the second actual angle θa2 decreases (that is, in the negative direction 6b).

Also in this period, just like time t11, by changing the rotation angle of the object 6 in the direction passing through the first transition range, it is possible to prevent the object 6 from unnecessarily rotating in a wide angle range.

[FIG. 9: After Time t12]

In the example of FIG. 9, at time t12, the values of the first target angle θt1 and the second target angle θt2 are the same as those of time t11. Further, the second actual angle θa2 changes in the decreasing direction as in the case just before time t12. On the other hand, the first actual angle θa1 increases discontinuously from 0° to a value slightly smaller than 360° by passing through the first transition range.

Therefore, the first angle deviation Δθ1 sharply decreases to 30° and changes from positive to negative, and the absolute value also sharply approaches zero. Further, the second angle deviation Δθ2 increases and continues to approach zero. Therefore, the difference between the absolute value of the first angle deviation Δθ1 and the absolute value of the second angle deviation Δθ2 decreases sharply and approaches zero, which is greater than P1 and smaller than P2. Further, the magnitude relationship between the first angle deviation Δθ1 and the second angle deviation Δθ2 fluctuates according to a nominal detection error in the first Hall IC 71 and the second Hall IC 72.

Therefore, in a period after time t12, if the absolute value of the second angle deviation Δθ2 is greater than the absolute value of the first angle deviation 401, the selection unit 13 proceeds from step S310 to step S320, and further from step S320 to step S350. If (i) the absolute value of the second angle deviation Δθ2 is smaller than the absolute value of the first angle deviation Δθ1 and (ii) the absolute value of the second angle deviation Δθ2 is the same as the absolute value of the first angle deviation Δθ1, the process proceeds from step S310 to step S330, and further from step S330 to step S350.

When the selection unit 13 proceeds to step S350 in such manner, since the current reference destination is the second sensor output X2, the selection unit 13 proceeds to step S360 and selects the second angle deviation Δθ2 as an output of the angle deviation Δθ. That is, the current reference destination is maintained as the second sensor output X2.

As a result, feedback control is performed by the proportional controller 14, the integrator 15, the integration controller 16, and the feedback control unit 17 according to the angle deviation Δθ output from the selection unit 13. Then, the feedback control unit 17 controls the actuator 2 so that the rotation angle of the object 6 approaches the second target angle θt2 from the second actual angle θa2. As a result, the second actual angle θa2 gradually approaches the second target angle θt2, and the first actual angle θa1 gradually approaches the first target angle θt1.

[FIG. 10: From Time t20 to Just Before Time t21]

Next, an example of FIG. 10 will be described.

This situation may occur in a period just after the example of FIG. 9, just before the example of FIG. 9, or in a period significantly separated from the example of FIG. 9.

In this example, the first target angle θt1 is constant during a period from time t20 to just before time t21, and the first actual angle θa1 is substantially the same as the first target angle θt1 and is substantially constant. Therefore, similarly, the second target angle θt2 is constant during this period, and the second actual angle θa2 is substantially the same as the second target angle θt2 and is substantially constant. Note that, as described above, the second target angle θt2 deviates by 180° from the first target angle θt1.

Therefore, during this period, the first angle deviation Δθ1 and the second angle deviation Δθ2 are substantially zero, and the value obtained by subtracting the absolute value of the second angle deviation Δθ2 from the absolute value of the first angle deviation Δθ1 is also substantially zero.

During this period, the selection unit 13 acquires the first angle deviation Δθ1 and the second angle deviation Δθ2 which are substantially zero in step S305, and subsequently in step S310, the absolute value of the first angle deviation $\Delta\theta1$ and the absolute value of the second angle deviation $\Delta\theta2$ are compared.

During the above period, these two absolute values are both substantially zero, and their magnitude relationship varies depending on nominal detection errors in the first Hall IC 71 and the second Hall IC 72. Further, since the absolute value of the first angle deviation $\Delta\theta1$ and the absolute value of the second angle deviation $\Delta\theta2$ are substantially the same, the difference between the absolute value of the first angle deviation $\Delta\theta1$ and the absolute value of the second angle deviation $\Delta\theta2$ is greater than the threshold value P1, and is smaller than the threshold P2.

Therefore, during the above period, if the absolute value of the second angle deviation $\Delta\theta2$ is greater than the absolute value of the first angle deviation 401, the selection unit 13 proceeds the process from step S310 to step S320, and further from step S320 to step S350. If (i) the absolute value of the second angle deviation $\Delta\theta2$ is smaller than the absolute value of the first angle deviation $\Delta\theta1$ and (ii) the absolute value of the second angle deviation $\Delta\theta2$ is the same as the absolute value of the first angle deviation $\Delta\theta1$, the process proceeds from step S310 to step S330, and further from step S330 to step S350.

When the selection unit 13 proceeds to step S350 in such manner, since the current reference destination is the second sensor output X2, the selection unit 13 further proceeds to step S360 and selects the second angle deviation $\Delta\theta2$ as an output of the angle deviation $\Delta\theta$. That is, the current reference destination is maintained as the second sensor output X2. Such an operation is repeated from time t20 to just before time t21.

Since the angle deviation $\Delta\theta$ output from the selection unit 13 during the above period is substantially zero, the actuator 2 keeps the rotation angle of the object 6 as the same angle (i.e., the angle stays unchanged) by the feedback control performed by the proportional controller 14, the integrator 15, the integration controller 16 and the feedback control unit 17.

[FIG. 10: Time t21]

At time t21 in the example of FIG. 10, the target calculation unit 10 changes the first target angle $\theta t1$ from 160° to 260° and outputs the output. Note that the value of the change (i.e., to 330°) is only an example, and is not limited to the above. Along with the above, the second target angle $\theta t2$ is changed from 340° to 260°+180°-360°=80° and is output. The first actual angle $\theta a1$ and the second actual angle $\theta a2$ are the same as before time t21.

Therefore, the first angle deviation $\Delta\theta1$ is 100°. Further, the second angle deviation $\Delta\theta2$ is -260°. Therefore, the difference between the absolute value of the first angle deviation $\Delta\theta1$ and the absolute value of the second angle deviation $\Delta\theta2$ is -160°, which is smaller than the threshold value P1.

Therefore, at time t21, the selection unit 13 proceeds from step S310 to step S320 because the absolute value of the second angle deviation $\Delta\theta2$ is greater than the absolute value of the first angle deviation $\Delta\theta1$. Further, since the difference between the absolute value of the first angle deviation $\Delta\theta1$ and the absolute value of the second angle deviation $\Delta\theta2$ is smaller than the threshold value P1, the process proceeds from step S320 to step S340. Then, in step S340, the reference destination is switched from the current second sensor output X2 to the first sensor output X1. That is, the value output as the angle deviation $\Delta\theta$ is switched from the second angle deviation $\Delta\theta2$ to the first angle deviation $\Delta01$.

As a result, feedback control is performed by the proportional controller 14, the integrator 15, the integration controller 16, and the feedback control unit 17 according to the angle deviation $\Delta\theta$ output from the selection unit 13. Then, the feedback control unit 17 controls the actuator 2 so that the rotation angle of the object 6 approaches the first target angle $\theta t1$ from the first actual angle $\theta a1$. This is because the angle deviation $\Delta\theta$ is the first angle deviation $\Delta\theta1$ corresponding to the difference between the first target angle $\theta t1$ and the first actual angle $\theta a1$. As a result, the object 6 is driven to rotate in the direction in which the first actual angle $\theta a1$ increases (that is, in the positive direction 6a).

Assuming, at time t21, that the angle deviation $\Delta\theta$ is the second angle deviation $\Delta\theta2$, and the feedback control unit 17 controls the actuator 2 so that the rotation angle of the object 6 approaches the second actual angle $\theta a2$ to the second target angle $\theta t2$. Then, finally, the rotation angle of the object 6 must be changed by as much an amount as 260° in the negative direction 6b for avoiding the second transition range. On the other hand, in this example, for avoiding the first transition range, the rotation angle of the object 6 is changed by 100° in the positive direction 6a via the second transition range. That is, by adopting the rotation scheme in the example described above, it is possible to prevent the object 6 from unnecessarily rotating in a wide angle range.

[FIG. 10: From Just after Time t21 to Just Before Time t22]

In the example of FIG. 10, the values of the first target angle $\theta t1$ and the second target angle $\theta t2$ are the same as those of time t21 during the period from time t21 to the time just before time t22. Then, the first actual angle $\theta a1$ and the second actual angle $\theta a2$ change sequentially. Specifically, both of the first actual angle $\theta a1$ and the second actual angle $\theta a2$ are increased by the feedback control described later.

Then, during this period, the first angle deviation $\Delta\theta1$ decreases from 100° and approaches zero. Also, the second angle deviation $\Delta\theta2$ decreases from -260° and moves away from zero. Therefore, the difference between the absolute value of the first angle deviation $\Delta\theta1$ and the absolute value of the second angle deviation $\Delta\theta2$ is also reduced, so that it is still smaller than the threshold value P1.

Therefore, in this period, the selection unit 13 proceeds from step S310 to step S320 because the absolute value of the second angle deviation $\Delta\theta2$ is greater than the absolute value of the first angle deviation $\Delta\theta1$. Further, since the difference between the absolute value of the first angle deviation $\Delta\theta1$ and the absolute value of the second angle deviation $\Delta\theta2$ is smaller than the threshold value P1, the process proceeds from step S320 to step S340. Then, in step S340, the reference destination is maintained as the current first sensor output X1. That is, the value output as the angle deviation $\Delta\theta$ is maintained at the first angle deviation $\Delta\theta1$.

As a result, feedback control is performed by the proportional controller 14, the integrator 15, the integration controller 16, and the feedback control unit 17 according to the angle deviation $\Delta\theta$ output from the selection unit 13. Then, the feedback control unit 17 controls the actuator 2 so that the rotation angle of the object 6 approaches the first target angle $\theta t1$ from the first actual angle $\theta a1$. This is because the angle deviation $\Delta\theta$ is the first angle deviation $\Delta\theta1$ corresponding to the difference between the first target angle $\theta t1$ and the first actual angle $\theta a1$. As a result, the object 6 is driven to rotate in the direction in which the first actual angle $\theta a1$ increases (that is, in the positive direction 6a).

Also in this period, as in time t21, by changing the rotation angle of the object 6 in the direction passing through the second transition range, it is possible to prevent the object 6 from unnecessarily rotating in a wide angle range.

[FIG. 10: After Time t22]

In the example of FIG. 10, at time t22, the values of the first target angle θt1 and the second target angle θt2 are the same as those of time t21. Then, the first actual angle θa1 changes in the increasing direction as in the case just before time t22. On the other hand, the second actual angle θa2 decreases discontinuously from a value slightly smaller than 360° to 0° by passing through the second transition range.

Therefore, the second angle deviation Δθ2 sharply increases up to 80° and changes from negative to positive, and the absolute value also sharply approaches zero. Further, the first angle deviation Δθ1 decreases and continues to approach zero. Therefore, the difference between the absolute value of the first angle deviation Δθ1 and the absolute value of the second angle deviation Δθ2 decreases sharply and approaches zero, and falls within the range of equal to or greater than P1 and equal to or less than P2. Further, the magnitude relationship between the first angle deviation Δθ1 and the second angle deviation Δθ2 fluctuates according to a nominal detection error in the first Hall IC 71 and the second Hall IC 72.

Therefore, in the period after time t22, if the absolute value of the second angle deviation Δθ2 is greater than the absolute value of the first angle deviation Δθ1, the selection unit 13 proceeds from step S310 to step S320, and further from step S320 to step S350. If (i) the absolute value of the second angle deviation Δθ2 is smaller than the absolute value of the first angle deviation Δθ1 and (ii) the absolute value of the second angle deviation Δθ2 is the same as the absolute value of the first angle deviation Δθ1, the process proceeds from step S310 to step S330, and further from step S330 to step S350.

When the selection unit 13 proceeds to step S350 in such manner, since the current reference destination is the first sensor output X1, the selection unit 13 proceeds to step S340 and selects the first angle deviation Δθ1 as the output angle deviation Δθ. That is, the current reference destination is maintained as the first sensor output X1.

As a result, feedback control is performed by the proportional controller 14, the integrator 15, the integration controller 16, and the feedback control unit 17 according to the angle deviation Δθ output from the selection unit 13. Then, the feedback control unit 17 controls the actuator 2 so that the rotation angle of the object 6 approaches the first target angle θt1 from the first actual angle θa1. As a result, the first actual angle θa1 gradually approaches the first target angle θt1, and the second actual angle θa2 gradually approaches the second target angle θt2.

As described above, the first transition range of the first sensor output X1 and the second transition range of the second sensor output X2 are separated from each other with respect to the rotation angle of the corresponding object 6. Further, the smaller the absolute value of the first angle deviation Δθ1, which is the difference between the first actual angle θa1 and the first target angle θt1, the easier it is for the selection unit 13 to select the first sensor output as the reference destination, and the greater the absolute value of the first angle deviation Δθ1, the easier it is for the selection unit 13 to select the second sensor output as the reference destination.

The possibility that the object 6 is unintentionally rotated in an unnecessarily wide angle range by avoiding the first transition range is higher as the first angle deviation Δθ1 is greater. Therefore, by performing the above, it is possible to reduce the possibility that the object 6 is rotated in an unnecessarily wide angle range.

(1) Further, when the absolute value of the first angle deviation Δθ1 is greater than the absolute value of the second angle deviation Δθ2, the selection unit 13 selects the second sensor output X2 as the reference destination. Further, when the absolute value of the second angle deviation Δθ2 is greater than the absolute value of the first angle deviation Δθ1, the first sensor output X1 is selected as the reference destination.

By adopting the above selection scheme, it is possible to adopt one of the two feedback controls, i.e., from among the feedback control using the first sensor output X1 and the feedback control using the second sensor output X2, which rotates the object 6 in a narrower angle range. Therefore, by performing the above, the possibility that the object 6 is rotated in an unnecessarily wide angle range can be reduced with higher certainty.

(2) Further, the selection unit 13 selects the second sensor output as the reference destination when (i) the absolute value of the first angle deviation Δθ1 is greater than the absolute value of the second angle deviation Δθ2, and (ii) the difference between the absolute value of the first angle deviation Δθ1 and the absolute value of the second angle deviation Δθ2 is greater than the threshold P2.

Further, when the absolute value of the first angle deviation Δθ1 is greater than the absolute value of the second angle deviation Δθ2 and the difference of the above is smaller than the threshold value P2, the selection unit 13 selects, as the reference destination, the one previously selected from among the first sensor output X1 and the second sensor output X2.

In such manner, when the first angle deviation Δθ1 and the second angle deviation Δθ2 are substantially the same, the possibility that the reference destination is switched unnecessarily and frequently due to the detection error of the sensor 7 is reducible.

Second Embodiment

Next, the second embodiment will be described with reference to FIGS. 11 and 12.

In the present embodiment, the behavior of the second sensor output X2 output by the second Hall IC 72 is different from that of the rotation system of the first embodiment.

Figure 11:
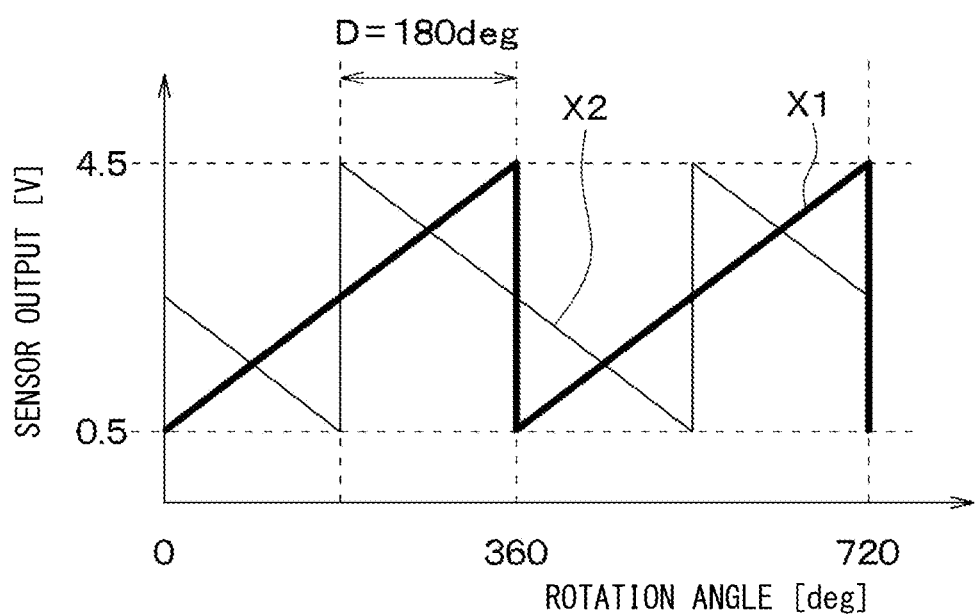
FIG. 11 is a diagram showing behavior of the first sensor output and the second sensor output according to the rotation angle in the second embodiment.

Specifically, the second Hall IC 72 of the present embodiment outputs the second sensor output X2 as shown in FIG. 11. The second sensor output X2 is calculated by the arithmetic circuit of the second Hall IC 72 in step S220 of the process of FIG. 5, as in the first embodiment.

The voltage of the second sensor output X2 is adjusted substantially to 0.5V to 4.5V, for example, as in the first embodiment. The second sensor output X2 calculated at such timing is a voltage value having a periodicity of 360° cycle as in the first embodiment. Then, the second sensor output X2 gradually decreases from the upper limit value to the lower limit value in a predetermined second normal range as the rotation angle of the object 6 increases within one cycle of itself. Then, the second sensor output X2, after passing through the second transition range deviating from (i.e., outside of) the second normal range as the rotation angle of the object 6 increases, changes in an increasing/decreasing direction (i.e., an increasing direction in this case) which a different direction of change from the second normal range, i.e., from the lower limit value to the upper limit value, in a manner more steeply than the second normal range.

Compared with the second sensor output X2 of the first embodiment, the increase/decrease of the second sensor output X2 of the present embodiment is reversed. Here, the arrangement and the angle width of the second normal range and the arrangement and the angle width of the second transition range are the same as those of the first embodiment. Therefore, the phase difference D between the first sensor output X1 and the second sensor output X2 is 180°. That is, the angle difference between the center of the first transition range and the center of the second transition range is 180°. Further, the first transition range and the second transition range do not overlap and are separated from each other.

Further, in the present embodiment, the second sensor output X2 decreases linearly and monotonically with respect to the rotation angle in the second normal range, but may decrease non-linearly or monotonically. Further, in the present embodiment, the second normal range extends across 0° and 360°, but may have a different range. However, the second normal range covers the entire first transition range. Further, in the present embodiment, the second sensor output X2 changes discontinuously in the second transition range, but it may change continuously.

For example, if the Hall voltages V21 and V22 are the same as in the first embodiment, the second sensor output X2 is calculated by the arithmetic expression X2=−K×{atan 3(V21/V22)+180° }+V0. Here, atan 3(V21/V22) is the same as that of the first embodiment. Alternatively, the arrangement of the two Hall elements of the second Hall IC 72 may be adjusted so that the Hall voltages V21 and V22 that can obtain the second sensor output X2 as shown in FIG. 11 are realized by the same calculation expression as in the first embodiment.

The hardware configuration of the rotation system other than the above is the same as that of the first embodiment. Further, the behavior of the first sensor output X1 output from the sensor 7 is also the same as that of the first embodiment. Further, the operations of the ECU 1 other than the target calculation unit 10 and the selection unit 13 are the same as those in the first embodiment.

In the first embodiment, the second target angle θt2 calculated and output by the target calculation unit 10 is a value deviated by 180° from the first target angle θt1 within the range of 0° or more and less than 360°. However, in the present embodiment, since the relationship between the first sensor output X1 and the second sensor output X2 is as shown in FIG. 11, it is not calculated so as to be simply shifted by 180° with respect to the first target angle θt1. Specifically, it is calculated by the expression θt2=180°−θt1 in a range where the first target angle θt1 is 0° or more and less than 180°, and by the expression θt2=360°−θt1 in a range where the first target angle θt1 is 180° or more and less than 360°. Other than that, the operations of the target calculation unit 10 are the same as those of the first embodiment.

Figure 12:
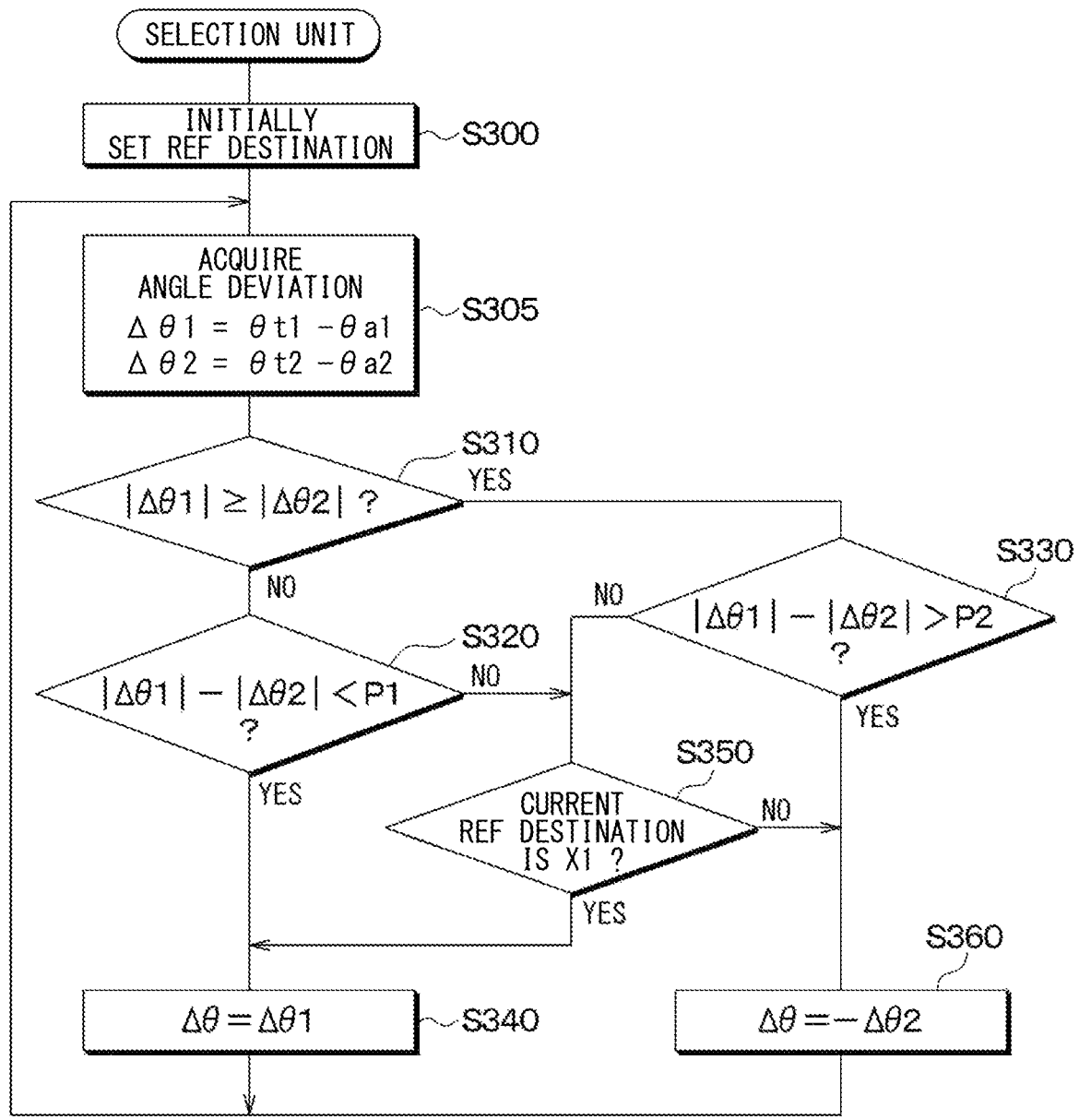
FIG. 12 is a flowchart showing processing contents of the selection unit.

Further, the selection unit 13 in the ECU 1 executes the process of FIG. 12 instead of the process of FIG. 8. Of the processes of FIG. 12, the only difference from FIG. 8 is step S360. In step S360, the reference destination is the second sensor output X2, which is the same as in the first embodiment, but the sign (+ or −) of the second angle deviation Δθ2 is inverted from the one of the second angle deviation Δθ2 in the first embodiment, as the angle deviation Δθ. This is because the direction of increase/decrease of the second actual angle θa2 based on the second sensor output X2 and the direction of increase/decrease of the rotation angle of the object 6 under the control of the actuator 2 are opposite to each other. That is, the sign is inverted in order to correct the relationship between the second sensor output X2 and the inverse characteristic of the actuator 2.

By the above operation and configuration, the rotation system of the present embodiment can realize the same operation and the same effect as the rotation system of the first embodiment.

Third Embodiment

Next, the third embodiment will be described with reference to FIG. 13. In the present embodiment, the behavior of the second sensor output X2 output by the second Hall IC 72 is different from that of the rotation system of the first embodiment.

Figure 13:
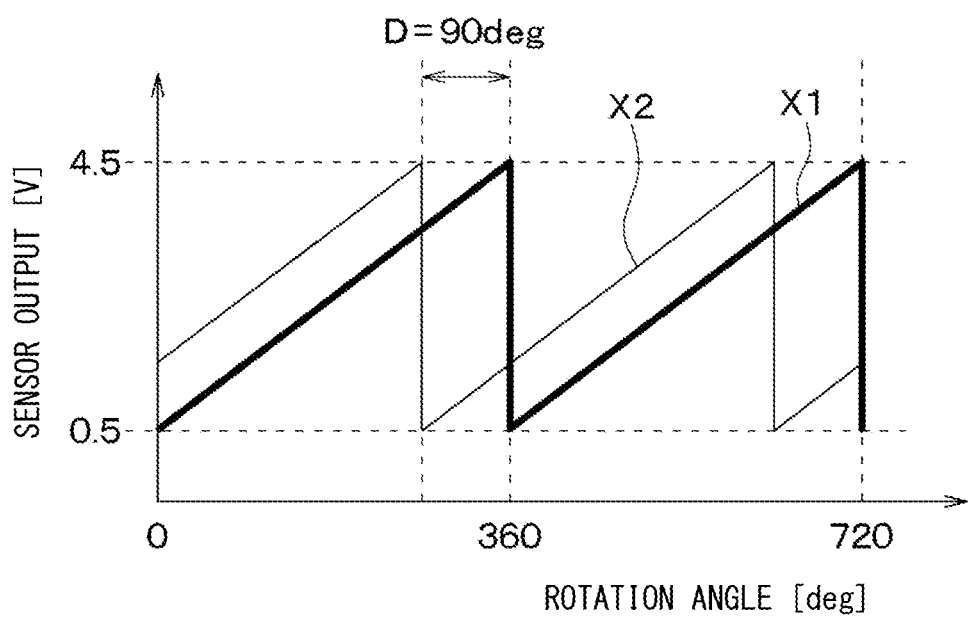
FIG. 13 is a diagram showing behavior of the first sensor output and the second sensor output according to the rotation angle in a third embodiment.

Specifically, the second Hall IC 72 of the present embodiment outputs the second sensor output X2 as shown in FIG. 13. The second sensor output X2 is calculated by the arithmetic circuit of the second Hall IC 72 in step S220 of the process of FIG. 5, as in the first embodiment.

The voltage of the second sensor output X2 is adjusted substantially to 0.5V to 4.5V, for example, as in the first embodiment. The second sensor output X2 calculated at such timing differs only in phase from the second sensor output X2 of the first embodiment.

Here, as shown in FIG. 13, the second normal range is a range of approximately 360° from 270° to 450°, and the second transition range has a width centered on 270°, 450°, and the like. It is in the range of almost 0°. However, in the second sensor output X2, the angle width of the second normal range may be narrower, and the angle width of the second transition range may be wider. Further, in the present embodiment, the second sensor output X2 decreases linearly and monotonically with respect to the rotation angle in the second normal range, but may decrease non-linearly or monotonically.

Further, in the present embodiment, the second normal range extends across 0° and 360°, but may have a different range. However, the second normal range covers the entire first transition range. Further, in the present embodiment, the second sensor output X2 changes discontinuously in the second transition range, but it may change continuously.

Therefore, the phase difference D between the first sensor output X1 and the second sensor output X2 is 90°. The phase of the second sensor output X2 is advanced by 90° with respect to the first sensor output X1. That is, the angle difference between the center of the first transition range and the center of the second transition range is 90°. Further, the first transition range and the second transition range do not overlap and are separated from each other.

For example, if the Hall voltages V21 and V22 are the same as in the first embodiment, the second sensor output X2 is calculated by the arithmetic expression X2=K×{atan3 (V21/V22)+90° }+V0. Here, atan 3(V21/V22) is the same as that of the first embodiment. Alternatively, the arrangement of the two Hall elements of the second Hall IC 72 is adjusted so that the Hall voltages V21 and V22 that can obtain the second sensor output X2 as shown in FIG. 13 can be realized by the same calculation expression as in the first embodiment. You may.

The hardware configuration of the rotation system other than the above is the same as that of the first embodiment. Further, the behavior of the first sensor output X1 output from the sensor 7 is also the same as that of the first embodiment. Further, the operation of the ECU 1 other than the target calculation unit 10 is the same as that of the first embodiment.

The target calculation unit 10 sets the value obtained by adding 90° from the first target angle θt1 as the second target angle θt2. Specifically, it is calculated by the expression θt2=180°−θt1 in a range where the first target angle θt1 is 0° or more and less than 180°, and by the expression θt2=360°− θt1 in a range where the first target angle θt1 is 180° or more and less than 360°. Other than that, the operations of the target calculation unit 10 are the same as those of the first embodiment.

By the above operation and configuration, the rotation system of the present embodiment can realize the same operation and the same effect as the rotation system of the first embodiment. Note that the phase difference D is not limited to 180° and 90°.

(Other Embodiments)

The present disclosure is not limited to the above-described embodiments, and can further be appropriately modified.

The embodiments described above are not independent of each other, that is, can be appropriately combined except when the combination is obviously impossible.

Further, in each of the above embodiments, the elements constituting the embodiment are not necessarily essential except when it is clearly stated that they are essential or when they are clearly considered to be essential in principle.

Further, in each of the embodiments described above, when numerical values such as the number, numerical value, quantity, range, and the like of the constituent elements of the embodiment are referred to, except in (i) case where the numerical values are expressly indispensable in particular, and (ii) case where the numerical values are obviously limited to a specific number in principle, and the like, the present disclosure is not limited to such specific number.

In particular, when multiple values are exemplified for a certain amount, it is also possible to adopt a value between the multiple values unless otherwise specified or when it is clearly impossible in principle.

Further, in each of the embodiments described above, when referring to the shape, positional relationship, and the like of the components and the like, it is not limited to the shape, positional relationship, and the like, except for (i) a case where the components are specifically specified, or (ii) a case where the components are fundamentally limited to a specific shape, positional relationship, and the like.

Further, the present disclosure also encompasses the following modifications and equal range modifications for each of the above embodiments.

In addition, the following modifications can be independently selected to be applied or not applied to the above-described embodiments.

That is, any combination of the following modifications can be applied to the above embodiments.

(First Modification)

In the above embodiment, the selection unit 13 does not necessarily change the reference destination to the second sensor output X2, even when the absolute value of the first angle deviation Δθ1 is greater than the absolute value of the second angle deviation Δθ2 in a situation of when the first sensor output X1 is selected as the reference destination.

That is, if the difference between the absolute value of the first angle deviation Δθ1 and the absolute value of the second angle deviation Δθ2 is equal to or greater than the threshold value P1 and less than the threshold value P2, the reference destination is maintained as the first sensor output X1.

However, the above configuration is not necessarily required. When the first sensor output X1 is selected as the reference destination and the absolute value of the first angle deviation Δθ1 is greater than the absolute value of the second angle deviation Δθ2, the reference destination may always be changed to the second sensor output X2. Similarly, when the second sensor output X2 is selected as the reference destination, if the absolute value of the second angle deviation Δθ2 is greater than the absolute value of the first angle deviation Δθ1, the reference destination may always be changed to the first sensor output X1.

In such manner, the reference destination may be switched unnecessarily frequently depending on the detection error of the first Hall IC 71 and the second Hall IC 72. That is, hunting may occur.

However, even if the hunting happens, it is unlikely that control of unnecessarily over/far-rotating the object 6 will occur regardless of whether the first sensor output X1 or the second sensor output X2 is adopted at the timing of hunting.

(Second Modification)

In the above embodiment, the selection unit 13 determines the reference destination based on the comparison result of the absolute value of the first angle deviation Δθ1 and the absolute value of the second angle deviation Δθ2.

However, the reference destination may be determined based on the comparison between the absolute value of the first angle deviation Δθ1 and a predetermined reference value (for example, 180°, 270°, etc.). Specifically, if the absolute value of the first angle deviation Δθ1 is smaller than the above reference value, the reference destination may be set to the first sensor output X1, and, if the absolute value of the first angle deviation Δθ1 is greater than the reference value, the reference destination may be set to the second sensor output X2. Even in such a process, it is possible to reduce the possibility of performing a control that over-rotates the object 6.

Third Modification

In each of the above embodiments, the behavior of the first sensor output X1 and the behavior of the second sensor output X2 may be interchanged.

Fourth Modification

In each of the above embodiments, the sensor 7 has two different Hall ICs, i.e., a first Hall IC 71 and a second Hall IC 72, and the first Hall IC 71 outputs the first sensor output X1 and the second Hall IC 72 the second sensor output X2.

However, the second Hall IC 72 may be abolished from the sensor 7, and both of the first sensor output X1 and the second sensor output X2 may be output from the first Hall IC 71. This is because the voltage values corresponding to the first sensor output X1 and the second sensor output X2 of each embodiment are calculable from the Hall voltages V11 and V12 generated by the first Hall IC 71.

What is claimed is:

1. A detection device for identifying a rotation angle of an object rotatable 360° or more comprising:
a sensor outputting a first sensor output that changes according to a change in the rotation angle, and outputting a second sensor output that changes differently from the first sensor output according to a change in the rotation angle;
a target calculation unit calculating a first target angle serving as a target value of a first actual angle corresponding to the first sensor output, and calculating a second target angle serving as a target value of a second actual angle corresponding to the second sensor output; and a selection unit selecting one of the first sensor output and the second sensor output as a reference destination used for driving the object, wherein the first sensor output, having a periodicity of 360° with respect to the rotation angle of the object, increases or decreases in a predetermined first normal range as the rotation angle increases within one cycle of own periodicity, and the increase or the decrease of the first sensor output reverses after passing of the rotation angle through a first transition range different from the first normal range, the second sensor output, having a periodicity of 360° with respect to the rotation angle of the object, increases or decreases in a predetermined second normal range as the rotation angle increases within one cycle of own periodicity, and the increase or the decrease of the second sensor output reverses after passing of the rotation angle through a second transition range, which is different from the second normal range, the first transition range and the second transition range are separated from each other, and the selection unit is configured to select the reference destination as a function of: (i) a first angle deviation, which is a difference between the first actual angle and the first target angle, and (ii) a second angle deviation, which is a difference between the second actual angle and the second target angle.

2. The detection device of claim 1, wherein
the selection unit selects, based on (i) the first angle deviation and (ii) a second angle deviation, which is a difference between the second actual angle with respect to the second target angle, (A) the second sensor output as the reference destination, when the absolute value of the second angle deviation is greater than the absolute value of the first angle deviation, and (B) the first sensor output as the reference destination, when the absolute value of the second angle deviation is greater than the absolute value of the first angle deviation.

3. The detection device of claim 1, wherein
the selection unit repeatedly performs a process of selecting, as the reference destination, one of the first sensor output and the second sensor output, and
the selection unit selects, as the reference destination,
(i) the second sensor output when (a) the absolute value of the first angle deviation is greater than the absolute value of the second angle deviation, and (b) a difference between the absolute value of the first angle deviation and the absolute value of the second angle deviation is greater than a threshold value, and
(ii) the previously selected one of the first sensor output and the second sensor output when (a) the absolute value of the first angle deviation is greater than the absolute value of the second angle deviation, and (c) a difference between the absolute value of the first angle deviation and the absolute value of the second angle deviation is greater than threshold value.

4. A control device for controlling an actuator that rotates an object rotatable 360° or more comprising:
a sensor outputting a first sensor output that changes according to a change in the rotation angle of the object, and outputting a second sensor output that changes differently from the first sensor output according to a change in the rotation angle of the object;

a target calculation unit calculating a first target angle serving as a target value of a first actual angle corresponding to the first sensor output, and calculating a second target angle serving as a target value of a second actual angle corresponding to the second sensor output;

a selection unit selecting one of the first sensor output and the second sensor output as a reference destination used for driving the object; and a feedback control unit (i) controlling the actuator so that the rotation angle of the object approaches the first target angle from the first actual angle when the selection unit selects the first sensor output, and (ii) controlling the actuator so that the rotation angle of the object approaches the second target angle from the second actual angle is provided when the selection unit selects the second sensor output, wherein the first sensor output, having a periodicity of 360° with respect to the rotation angle of the object, increases or decreases in a predetermined first normal range as the rotation angle increases within one cycle of own periodicity, and the increase or the decrease of the first sensor output reverses after passing of the rotation angle through a first transition range different from the first normal range, the second sensor output, having a periodicity of 360° with respect to the rotation angle of the object, increases or decreases in a predetermined second normal range as the rotation angle increases within one cycle of own periodicity, and the increase or the decrease of the second sensor output reverses after passing of the rotation angle through a second transition range different from the second normal range, the first transition range and the second transition range are separated from each other, and the smaller an absolute value of a first angle deviation, which is a difference between the first actual angle and the first target angle, the easier it is configured for the selection unit to select the first sensor output as the reference destination, and the larger an absolute value of the first angle deviation, the easier it is configured for the selection unit to select the second sensor output as the reference destination.

5. A control method for controlling an actuator that rotates an object rotatable 360° or more comprising steps of:
acquiring a first sensor output and a second sensor output from a sensor that outputs the first sensor output that changes according to a change in a rotation angle of the object, and outputs the second sensor output that changes differently from the first sensor output according to a change in the rotation angle of the object, and calculating a first target angle serving as a target value of a first actual angle corresponding to the first sensor output, and a second target angle serving as a target value of a second actual angle corresponding to the second sensor output;

selecting one of the first sensor output and the second sensor output as a reference destination to be used for driving the object; and controlling the actuator (A) so that the rotation angle of the object approaches the first target angle from the first actual angle when the first sensor output is selected in the above selecting, and (B) so that the rotation angle of the object approaches the second target angle from the second actual angle when the second sensor is selected in the above selecting, wherein the first sensor output, having a periodicity of 360° with respect to the rotation angle of the object, increases or decreases in a predetermined first normal range as the rotation angle increases within one cycle of own periodicity, and the increase or the decrease of the first sensor output reverses after passing of the rotation angle through a first transition range different from the first normal range, the second sensor output, having a periodicity of 360° with respect to the rotation angle of the object, increases or decreases in a predetermined second normal range as the rotation angle increases within one cycle of own periodicity, and the increase or the decrease of the second sensor output reverses after passing of the rotation angle through a second transition range different from the second normal range, the first transition range and the second transition range are separated from each other, and the smaller an absolute value of a first angle deviation, which is a difference between the first actual angle and the first target angle, the easier it is configured for the selecting to select the first sensor output as the reference destination, and the larger an absolute value of the first angle deviation, the easier it is configured for the selecting to select the second sensor output as the reference destination.

6. The detection device of claim 1, wherein the detection device is configured to:
   (i) initially set the first sensor output or the second sensor output as a set reference destination;
   (ii) determine the first angle deviation;
   (ii) determine the second angle deviation, which is a difference between the second actual angle and the second target angle; and
   (iii) select one of the first sensor output or the second sensor output as the reference destination based at least partly upon at least two of the following four conditions:
   a first condition is defined as whether an absolute value of the first angle deviation is greater than or equal to an absolute value of the second angle deviation;
   a second condition is defined as determining whether a difference between the absolute value of the first angle deviation and the absolute value of the second angle deviation is less than a negative threshold value;
   a third condition is defined as determining whether the difference between the absolute value of the first angle deviation and the absolute value of the second angle deviation is greater than a positive threshold value; and
   a fourth condition is defined as determining whether a current reference destination is the first sensor output.

7. The detection device of claim 1, wherein upon determining that the first condition is NO and the second condition is YES:
   the first sensor output is kept or is selected as the reference designation, and
   the first angle deviation is selected as the angle deviation for control.

8. The detection device of claim 6, wherein, upon determining that the first condition is NO, the second condition is NO, and the fourth condition is YES:
   the first sensor output is kept as the reference designation, and
   the first angle deviation is selected as the angle deviation for control.

9. The detection device of claim 6, wherein, upon determining that the first condition is NO, the second condition is NO, and the fourth condition is NO:
   the second sensor output is kept as the reference designation, and
   the second angle deviation is selected as the angle deviation for control.

10. The detection unit of claim 6, wherein upon determination that the first condition is YES, the third condition is NO, and the fourth condition is YES:
    the first sensor output is kept as the reference designation, and
    the first angle deviation is selected as the angle deviation for control.

11. The detection unit of claim 6, wherein upon determination that the first condition is YES, the third condition is NO, and the fourth condition is NO:
    the second sensor output is kept as the reference designation, and
    the second angle deviation is selected as the angle deviation for control.

12. The detection unit of claim 6, wherein upon determination that the first condition is YES, and the third condition is YES:
    the second sensor output is kept or is selected as the reference designation, and
    the second angle deviation is selected as the angle deviation for control.

* * * * *